(12) United States Patent
Ono et al.

(10) Patent No.: US 7,953,821 B2
(45) Date of Patent: May 31, 2011

(54) PRESENCE INFORMATION PROVIDING SYSTEM, AND METHOD AND SERVER THEREOF

(75) Inventors: Yoshihiro Ono, Tokyo (JP); Naoko Ito, Tokyo (JP); Anett Schüelke, Heidelberg (DE)

(73) Assignee: NEC Corporation, Tokyo (JP)

( * ) Notice: Subject to any disclaimer, the term of this patent is extended or adjusted under 35 U.S.C. 154(b) by 1580 days.

(21) Appl. No.: 11/101,452

(22) Filed: Apr. 8, 2005

(65) Prior Publication Data

US 2005/0262195 A1 Nov. 24, 2005

(30) Foreign Application Priority Data

Apr. 9, 2004 (JP) ................... 2004-116164

(51) Int. Cl.
*G06F 15/16* (2006.01)
*G06F 9/46* (2006.01)
(52) U.S. Cl. .................. 709/219; 709/204; 709/248
(58) Field of Classification Search .................. 709/204, 709/219, 248; 718/102
See application file for complete search history.

(56) References Cited

U.S. PATENT DOCUMENTS

| 6,549,937 | B1 * | 4/2003 | Auerbach et al. | ............. 709/206 |
| 6,658,095 | B1 * | 12/2003 | Yoakum et al. | ............. 379/93.01 |
| 6,757,722 | B2 | 6/2004 | Lonnfors et al. | |
| 7,020,480 | B2 * | 3/2006 | Coskun et al. | ................. 455/466 |
| 7,634,558 | B1 * | 12/2009 | Mangal et al. | ................. 709/224 |

FOREIGN PATENT DOCUMENTS

| JP | 2003-186775 | | 7/2003 |
| JP | 2005-135216 | A | 5/2005 |
| JP | 2006-511853 | A | 4/2006 |
| WO | WO 2004008178 | A2 * | 1/2004 |

OTHER PUBLICATIONS

M. Matsumoto et al., "A Study of "Event Driven" Type Notification Method for Presence Information," IEICE Technical Report, Japan, Institute of Electronics, Information and Communication Engineers, Mar. 8, 2007, vol. 101:715, pp. 185-190 (CSDB No. CS-NG-2004-00159-023).
T. Wakasugi et al., "A Study on a Method of Translating Presence," Transactions of the Institute of Electronics, Information and communication Engineers, Japan, Institute of Electronics, Information and Communication Engineers, Mar. 3, 2003, vol. 2003, Communication 2, p. 190.
Wireless Village, "The Mobile IMPS Initiative Features and Functions," Version 1.1 'Online! 2002, XP002345674 retrieved from the Internet: URL:http//www.openmobilealliance.org/tech/affiliates/wv/wv_features_functions_v1.1.pdf>.

* cited by examiner

*Primary Examiner* — Larry Donaghue
*Assistant Examiner* — Brian J Gillis
(74) *Attorney, Agent, or Firm* — Foley & Lardner LLP.

(57) ABSTRACT

The invention provides a presence information providing system providing suitable presence information for each application using a presence service without providing a special apparatus on the existing presence service side, and a method and a server thereof. A presence processing server 30 connected between a presence server 10A and a presence server 10B processes presence information of a client A received from the presence server 10A and presence information of a client B received from the presence server 10B into suitable presence information for each application.

42 Claims, 21 Drawing Sheets

F I G. 10
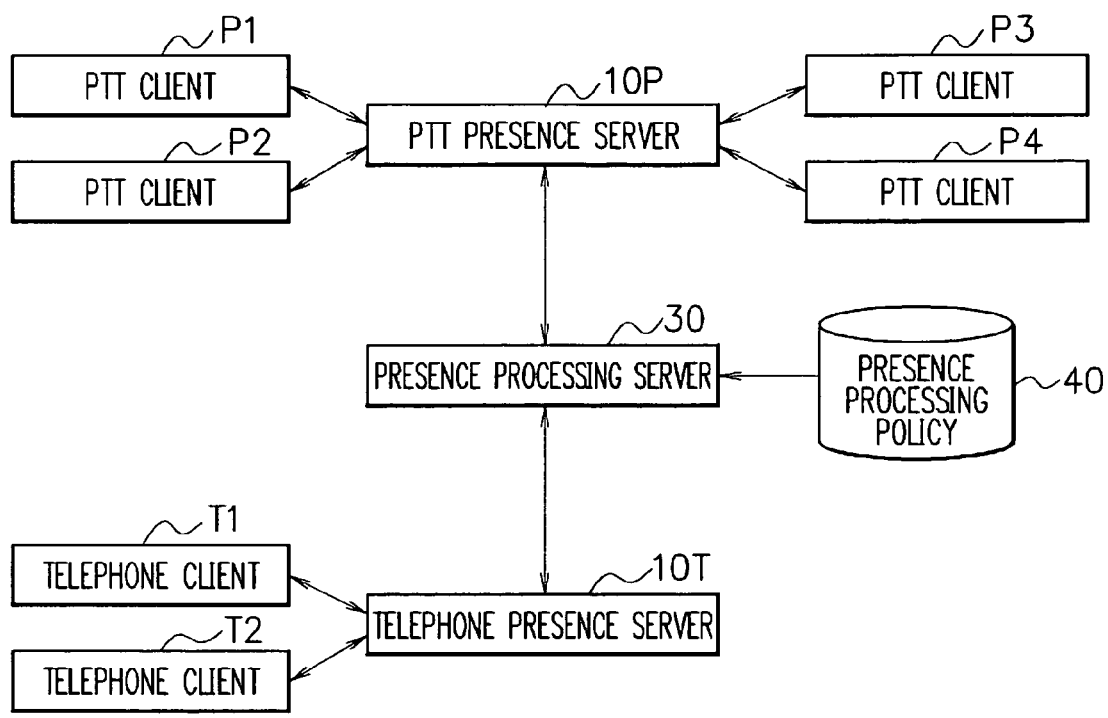

FIG. 11
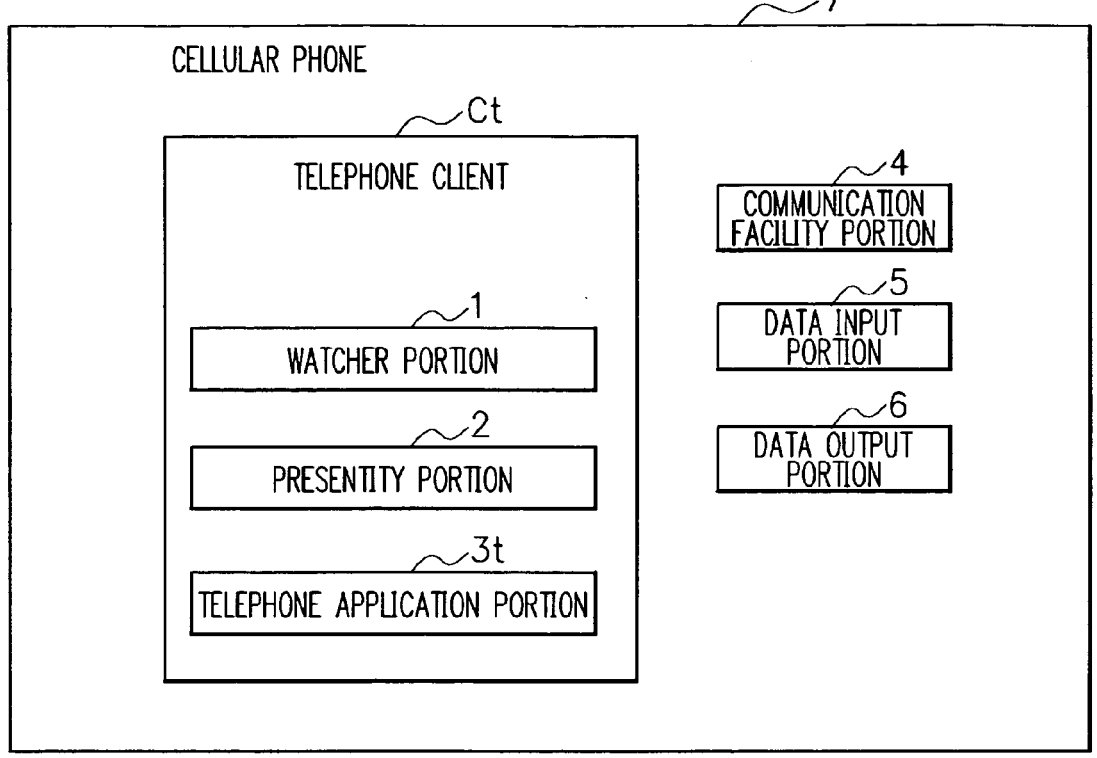
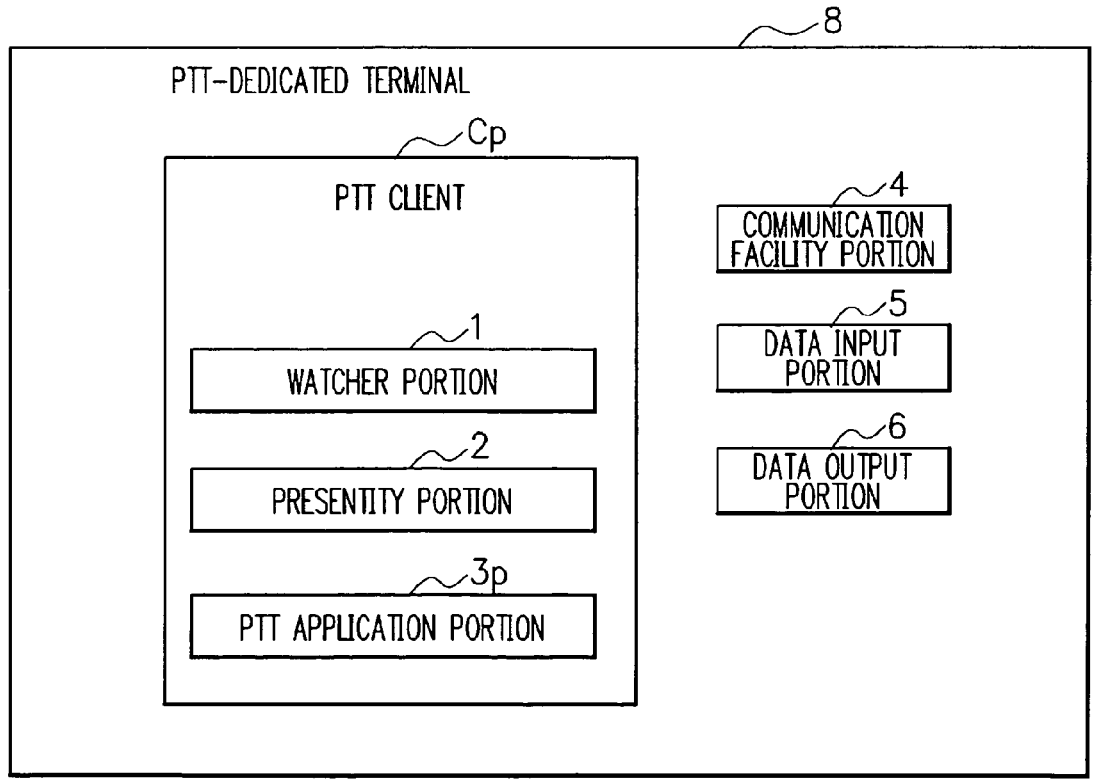

F I G. 13
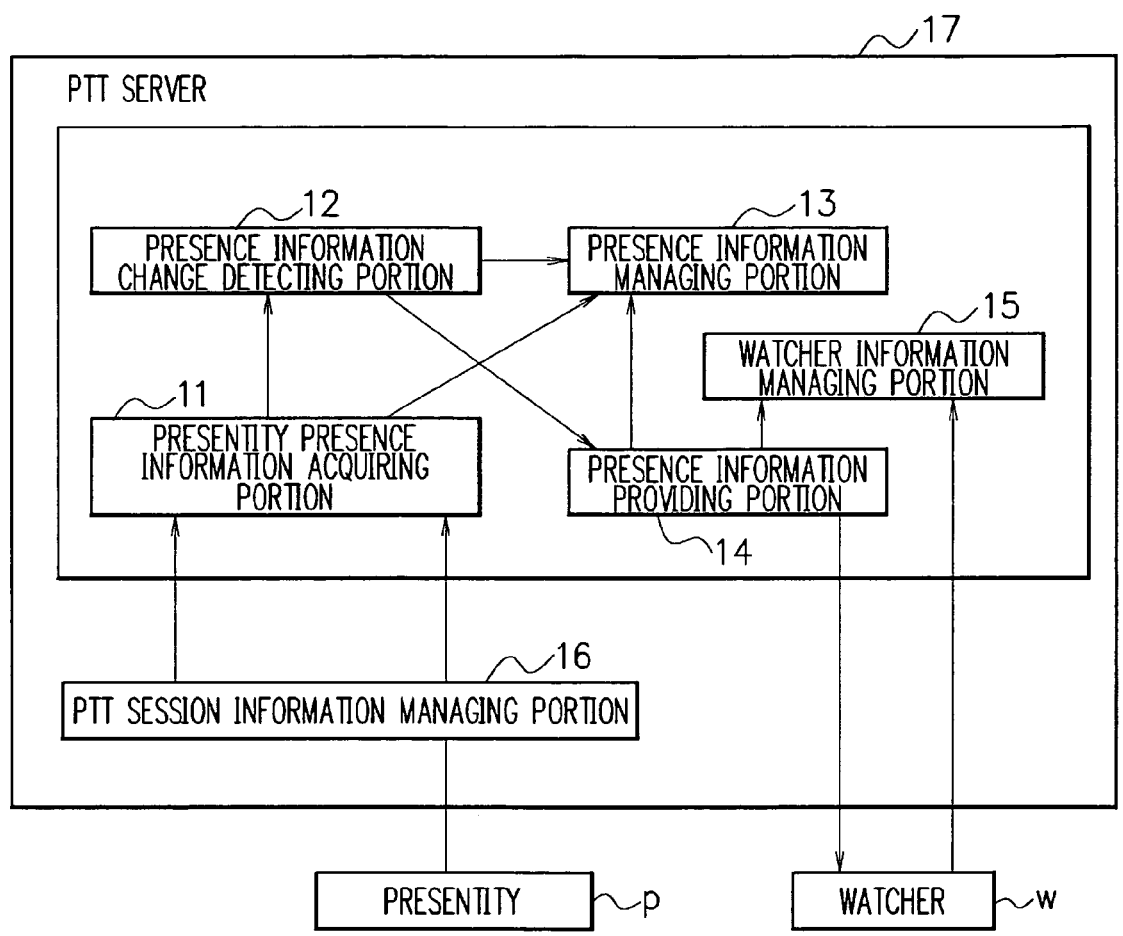

F I G. 15
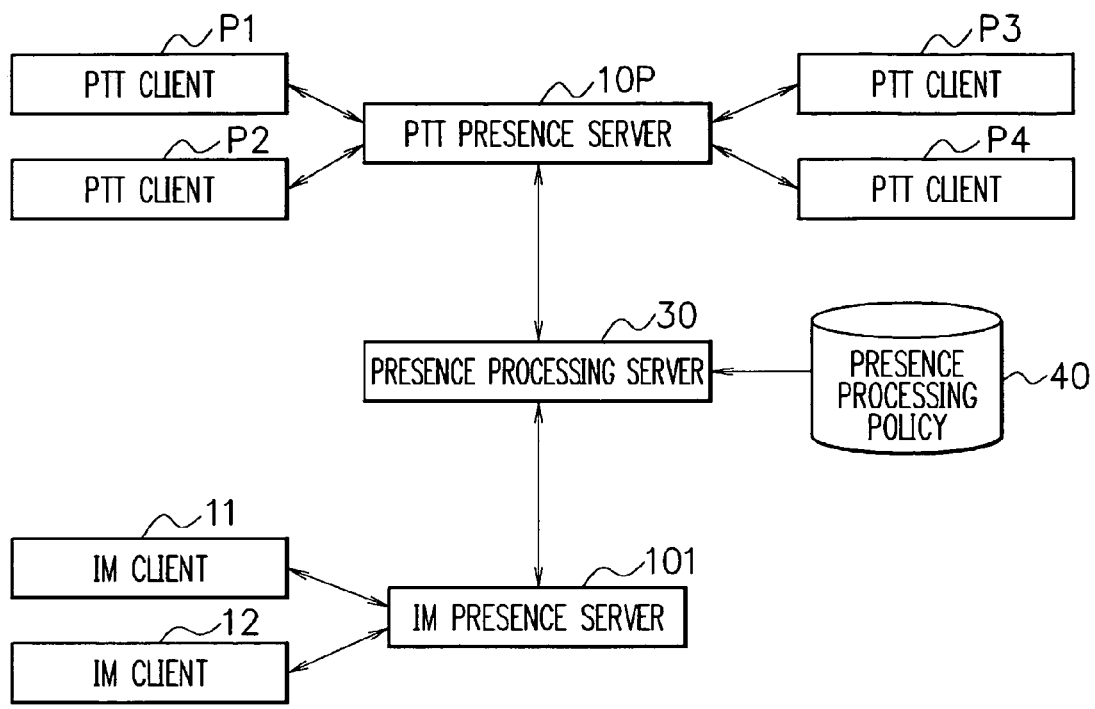
F I G. 16
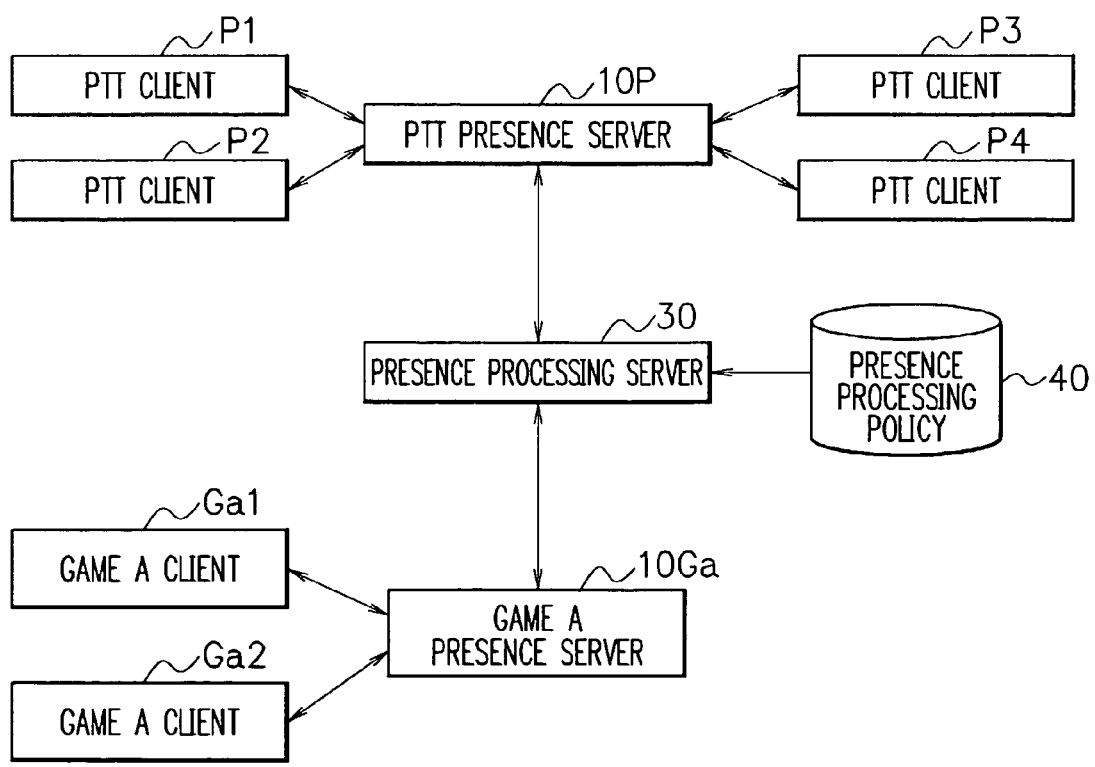

F I G. 17
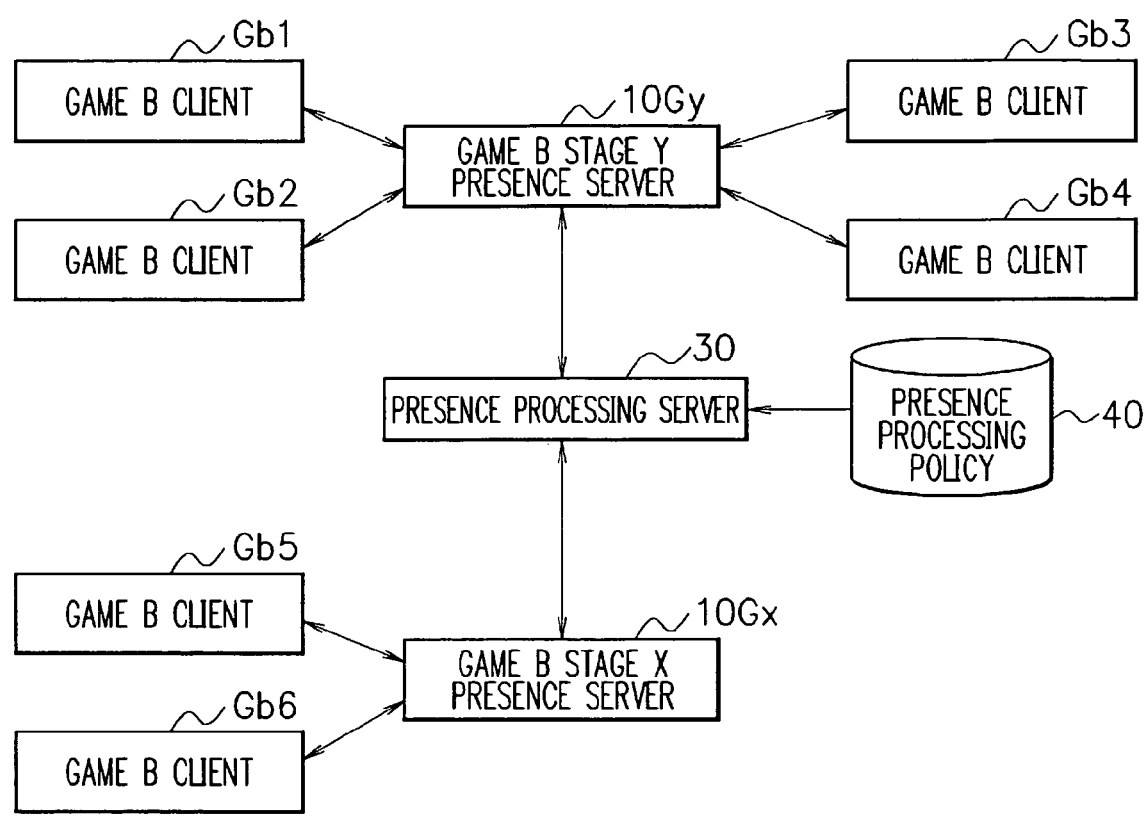

F I G. 18
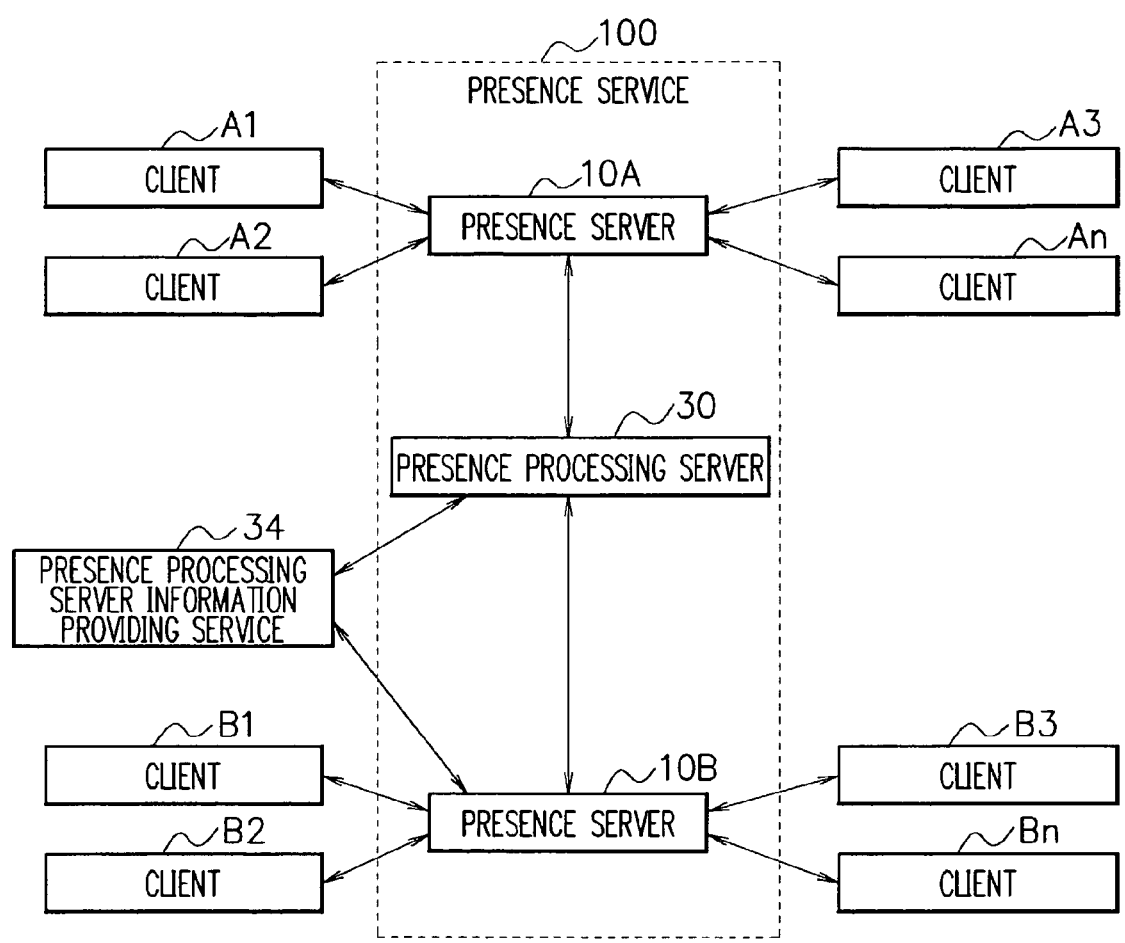

F I G. 22
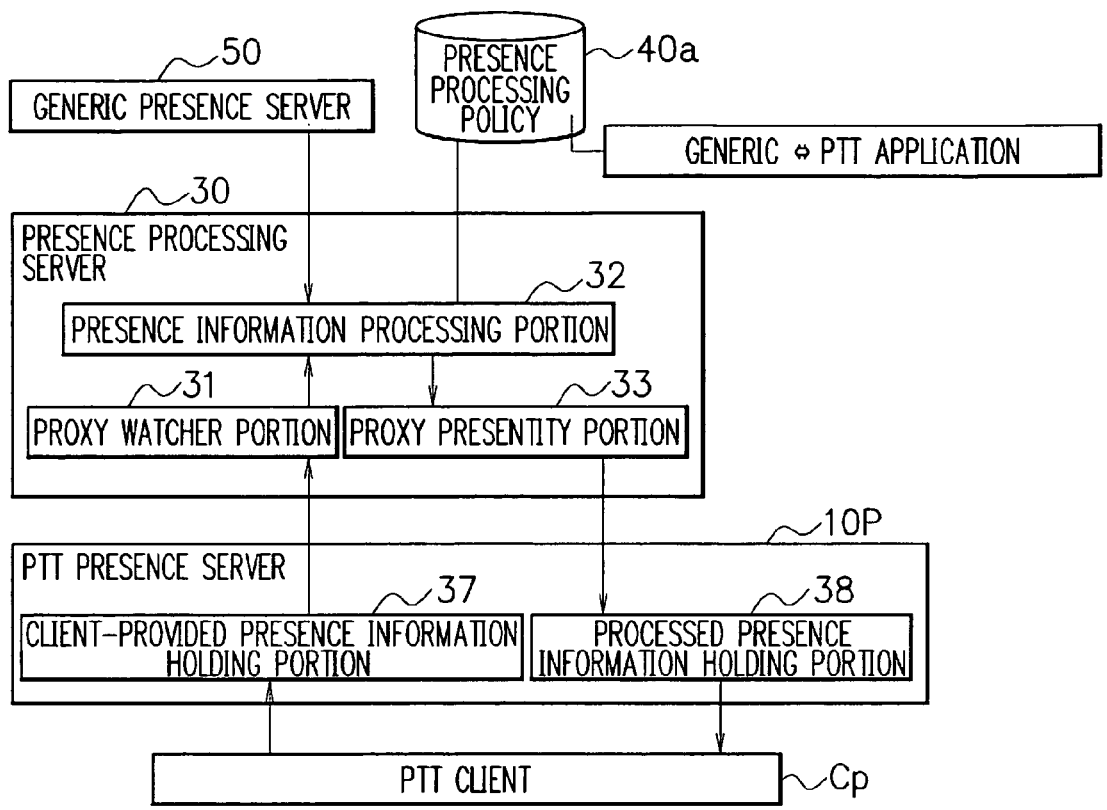
F I G. 23
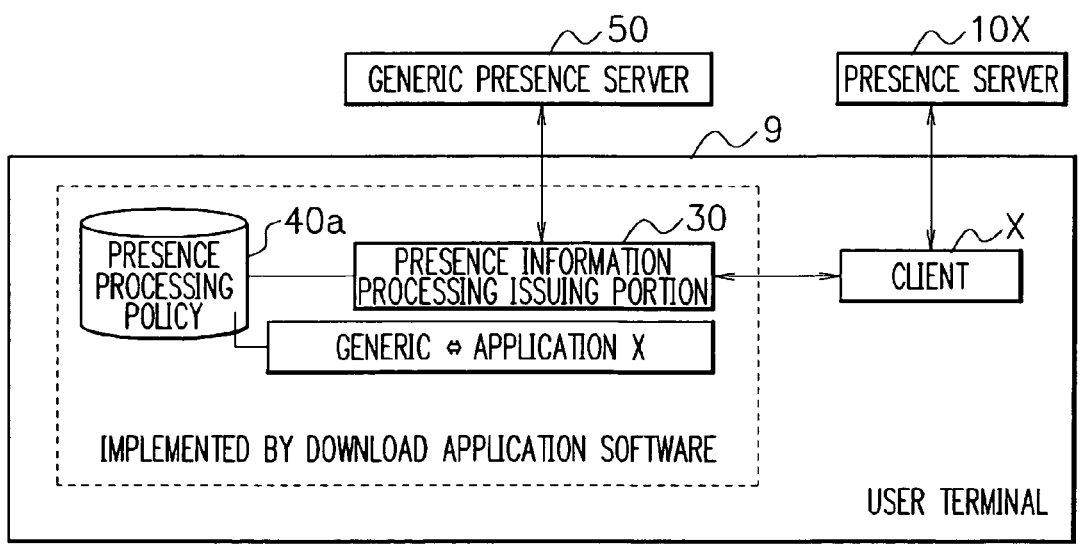

PRESENCE INFORMATION PROVIDING SYSTEM, AND METHOD AND SERVER THEREOF

BACKGROUND OF THE INVENTION

1. Field of the Invention

The present invention relates to a presence information providing system which can provide presence information in a form that is easily used by each application among a plurality of applications which are provided with presence information different in structure, and a method and a server thereof.

2. Description of Related Art

The configuration of a conventional presence service will be described with reference to FIG. 1. This follows a presence service model defined in RFC 2778: "A Model for Presence and Instant Messaging" published by IETF (Internet Engineering Task Force). In the description below, "presence information" of the presence service refers to information representing a state of a device or a state of a user of a device, e.g. information of "online" and "offline" indicating whether the device is connected to a network or not, information of "response possible" and "response impossible" indicating whether a user of a communication device can immediately respond or not, and so on. If some question arises as to the meaning of a term, a meaning defined in RFC 2778: "A Model for Presence and Instant Messaging" is followed in principle, but the meaning of the term is not limited thereto.

In FIG. 1, a presence service 100 is a service that provides presence information of a presentity P requested from a watcher W. The watcher is an entity requesting presence information of a desired presentity from the presence service and acquiring presence information from the presence service, and the presentity is an entity providing its own presence information to the presence service. If some question arises as to the meaning of a term, a meaning defined in RFC 2778: "A Model for Presence and Instant Messaging" is followed in principle, but the meaning of the term is not limited thereto.

As shown in FIG. 1, there is a presence server 10 as one example of an implemented form of the presence service 100. There is a presence service client PC having functions of both the presentity P3 and the watcher W3. The presence service client is an entity which provides a state of a client itself to the presence server using the function possessed by the presentity, and acquires presence information of a desired presentity from the presence server using the function possessed by the watcher.

As shown in FIG. 1, there may be a plurality of presentities P providing presence information to the presence service 100, and there may be a plurality of watchers W receiving presence information. Further, the presentity and the watcher of the presence service client PC or the like may be connected to the presence service as one service client.

As for the usage form of the presence service, it is necessary that one user should first check the state of another user being a communication partner when the user speaks to the communication partner in, for example, the instant message (IM) service, the push-to-talk (hereinafter referred to as "PTT") service and the like, and the presence service is used for checking the state of the user being the communication partner.

For more detailed description of the usage form of the presence service as an example of the PTT service, the presence service client is a PTT client on a PTT-dedicated terminal or the like. The presence server is a presence server managing the state of the PTT client disposed on the network.

The PTT client uses its own presentity function to notify the presence server of information about the current state of the PTT client, i.e. calling, not-calling (response possible), being out of the radius of communication, or the like. The PTT client uses its own watcher to request the state of the PTT client of the communication partner from the presence server and receive the provision of presence information of the PTT client. The presence service is used such that the state of the PTT client of the communication partner is checked with display on a screen or the like of the PTT-dedicated terminal, and if the PTT client is in a response possible state, a new PTT session is established to communicate with the communication partner.

For the presence service described above, a plurality of presence services may be combined to provide presence information instead of using just one presence service. For example, in presence services in communication services for cellular phones and the like, presence services of a plurality of applications including communication services provided through cellular phones and the like, e.g. applications of call, PTT, electronic-mails, Web access, games and the like are combined.

There are cases where structures of presence information about presence services in the combination of a plurality of presence services do not coincide. In this case, if presence information provided by the presentity is provided directly to the watcher, the presence information is not appropriate information from a viewpoint of the watcher, and therefore it is necessary to absorb the inconsistency by some method to enable presence information to be exchanged.

As one method for absorbing the inconsistency of structures of the presence information described above, a technique has been proposed in which for interconnecting presence services of presence information structured in different ways, a presence information converting apparatus converting contents of presence information is provided in the presence service, whereby contents of presence information are mutually exchanged in accordance with a conversion rule managed by conversion rule managing means (see, for example, Japanese Patent Laid-Open No. 2003-186775).

However, if presence information is structured in different ways, the conventional method in which contents of presence information are converted by the presence information converting apparatus and presence services are interconnected has a problem such that a special apparatus or mechanism which would not be required for a single presence service should be provided on the existing presence service side, and thus labor, time and costs are required for work procedures for incorporation of the apparatus or mechanism in a system.

SUMMARY OF THE INVENTION

The present invention has been made in view of the above problem, and its object is to provide a presence information providing system which can provide presence information suitable for each application using a presence service without providing a special apparatus on the existing presence service side, and a method and a server thereof.

A presence information providing system according to the present invention comprises a presence processing server processing received presence information so that presence information received from one presence service matches other presence services, among presence servers of a plurality of presence services different in structure of presence information sent/received between the presence server and a client, wherein the presence processing server provides the processed presence information to other presence services by virtually realizing a presentity and a watcher.

In the presence information providing system according to the present invention, the presence processing server processes presence information by reference to a processing policy in which a rule is set for processing presence information different in structure so that it can be used among a plurality of presence services. In the processing policy, a rule in which between presence services of applications for which multiple sessions are possible and other applications, presence information for which a new session is possible between applications for which multiple sessions are possible is determined to be presence information for which a new session is impossible between the application for which multiple sessions are possible and the other application may be set, and a rule for processing presence information into presence information provided to other presence services by reference to a plurality of presence information given respective priorities, received from a plurality of presence services, may be set.

The presence information providing system according to the present invention comprises a presence processing server information providing service accepting an inquiry from a presence service, and specifying from a plurality of presence processing servers a presence processing server processing presence information received from one presence service so that it matches other presence services.

The presence information providing system according to the present invention comprises a user terminal information managing server routing provision of presence information between a first user terminal having a plurality of application clients and a second user terminal having one or more application clients including application clients different from application clients possessed by the first user terminal.

The presence information providing system according to the present invention comprises a generic presence server holding presence information as a base covering an entire presence service referenced when presence information is processed by the presence processing server by reference to the processing policy.

In a method of providing presence information according to the present invention, a presence processing server connected among presence servers of a plurality of presence services different in structure of presence information sent/received between the presence server and a client receives presence information from one presence service, processes the received presence information so that it matches other presence services, and provides the processed presence information to other presence services by virtually realizing a presentity and a watcher.

In the method of providing presence information according to the present invention, the presence processing server processes presence information by reference to a processing policy in which a rule is set for processing presence information different in structure so that it can be used among a plurality of presence services. In the processing policy, a rule in which between presence services of applications for which multiple sessions are possible and other applications, presence information for which a new session is possible between applications for which multiple sessions are possible is determined to be presence information for which a new session is impossible between the application for which multiple sessions are possible and the other application may be set, and a rule for processing presence information into presence information provided to other presence services by reference to a plurality of presence information given respective priorities, received from a plurality of presence services, may be set.

In the method of providing presence information according to the present invention, a presence processing server information providing service accepts an inquiry from a presence service, and specifies from a plurality of presence processing servers a presence processing server processing presence information received from one presence service so that it matches other presence services.

In the method of providing presence information according to the present invention, a user terminal information managing server routs provision of presence information between a first user terminal having a plurality of application clients and a second user terminal having one or more application clients including application clients different from application clients possessed by the first user terminal.

In the method of providing presence information according to the present invention, the presence processing server references presence information as a base covering an entire presence service held by a generic presence server when processing presence information by reference to the processing policy. The presence processing server may process presence information received from one presence service into presence information as a base covering the entire presence service held by the generic presence server by reference to the processing policy, and further process the processed presence information as a base into presence information provided to other presence services by reference to the processing policy.

A server according to the present invention is connected among a plurality of presence servers of a plurality of presence services different in structure of presence information sent/received between the presence server and a client, processes presence information received from one presence service so that it matches other presence services, and provides the processed presence information to other presence services.

In the server according to the present invention, the presence processing server processes presence information by reference to a processing policy in which a rule is set for processing presence information different in structure so that it can be used among a plurality of presence services. In the processing policy, a rule in which between presence services of applications for which multiple sessions are possible and other applications, the presence information is determined to be presence information for which a new session is possible between applications for which multiple sessions are possible, and the presence information is determined to be presence information for which a new session is impossible between the application for which multiple sessions are possible and the other application may be set, and a rule for processing presence information into presence information provided to other presence services by reference to a plurality of presence information given respective priorities, received from a plurality of presence services, may be set.

The server according to the present invention is specified from a plurality of presence processing servers by a presence processing server information providing service accepting an inquiry from a presence service, and processes presence information received from one presence service so that it matches other presence services.

The server according to the present invention references presence information as a base covering an entire presence service held by a generic presence server when processing presence information by reference to the processing policy.

According to the presence information providing system of the present invention, and the method and the server thereof, appropriate presence information can be provided for each application using a presence service without providing a special apparatus on the existing presence service side.

BRIEF DESCRIPTION OF THE DRAWINGS

The objects and features of the present invention will become more apparent from the consideration of the following detailed description taken in conjunction with the accompanying drawings, in which:

FIG. 10 shows the configuration of the presence service system in the second Example of the present invention;

FIG. 11 shows the configuration of the client in the second Example of the present invention;

FIG. 13 shows the configuration of a PTT server in the second Example of the present invention;

FIG. 15 shows the configuration of the presence service system in the third Example of the present invention;

FIG. 16 shows the configuration of the presence service system in the fourth Example of the present invention;

FIG. 17 shows the configuration of the presence service system in the fifth Example of the present invention;

FIG. 18 shows the configuration of the presence service system in the sixth Example of the present invention;

FIG. 22 shows the configuration of a PTT presence service system in the ninth Example of the present invention;

FIG. 23 shows the configuration of a system registering a presence processing policy in the ninth Example of the present invention;

DESCRIPTION OF THE PREFERRED EMBODIMENTS

Figure 1:
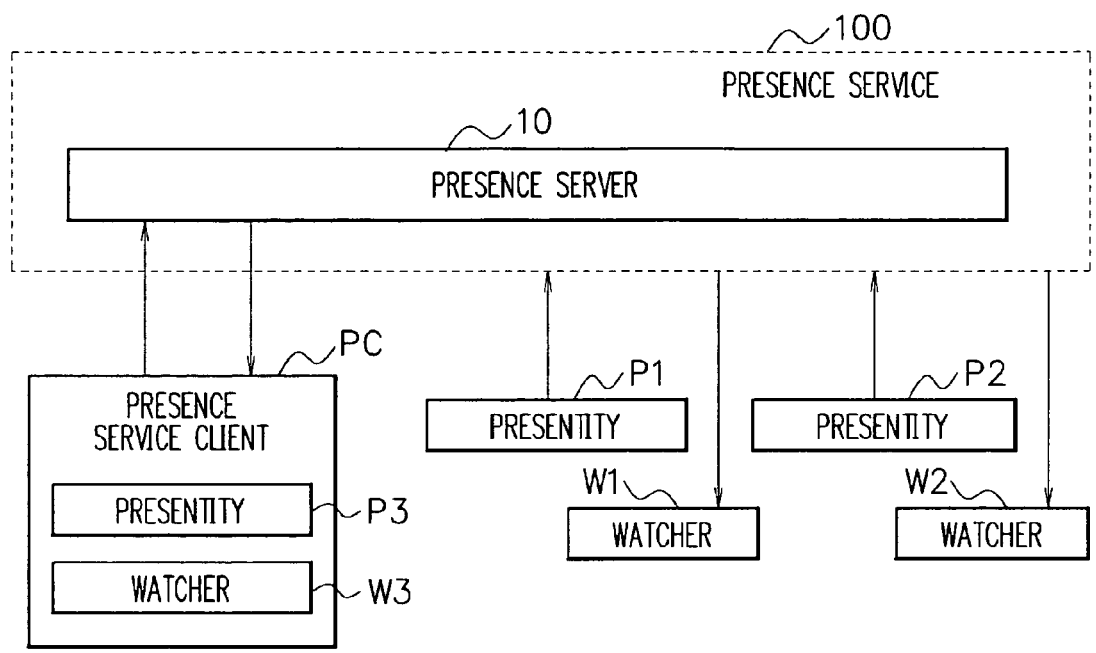
FIG. 1 shows the configuration of the conventional presence service system.
Figure 2:
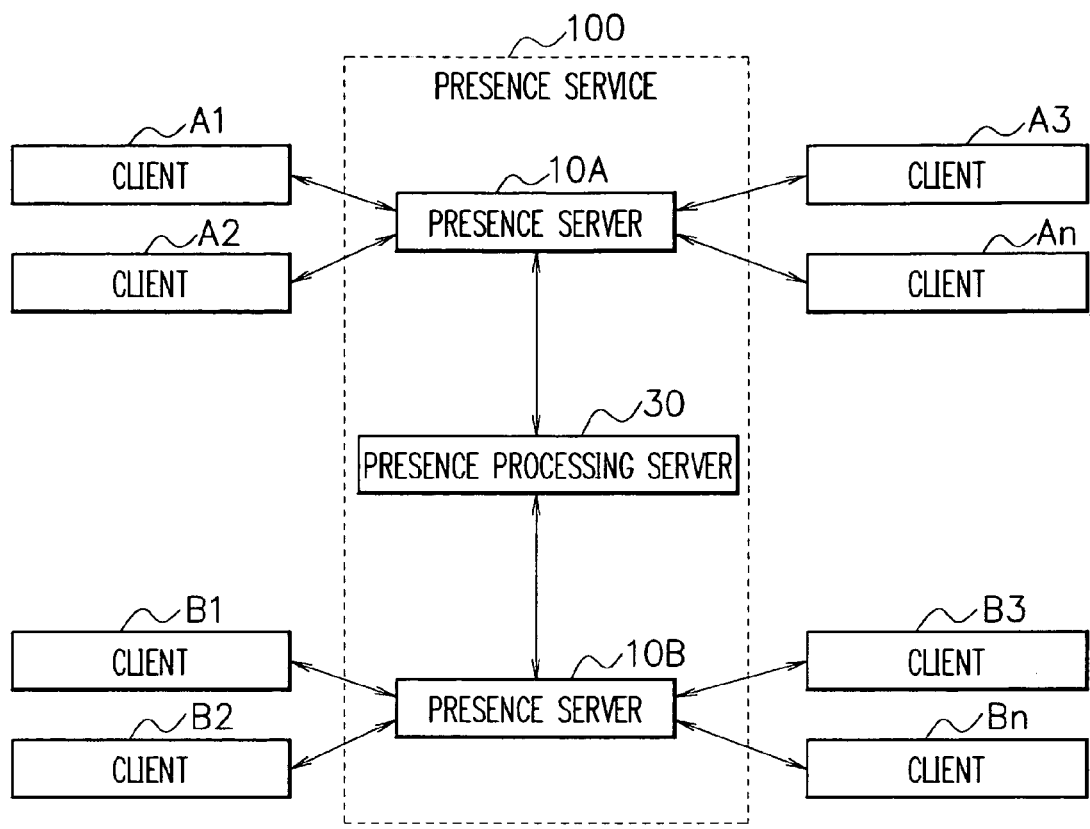
FIG. 2 shows the configuration of a presence service system in an embodiment of the present invention.

Embodiments of the present invention will be described below with reference to the drawings. In FIG. 2, a presence server 10A manages presence information of a client using any application A. Clients A1 to n (n is any positive integer) communicate with the presence server 10A, register their own presence information in the presence server 10A, and receive the provision of presence information of a client other than themselves using the application A from the presence server 10A.

For example, the client A1 is a watcher requesting presence information of desired one of clients A2 to n being presentities from the presence server 10A, and one of clients A2 to n of which presence information has been requested by the client A1 is the presentity providing its own presence information to the presence server 10A. This is a presence service under the presence server 10A for the conventional single application A.

Similarly, a presence server 10B manages presence information of a client using an application B. Clients B1 to n (n is any positive integer) communicate with the presence server 10B, register their own presence information in the presence server 10B, and receive the provision of presence information of a client other than themselves using the application B from the presence server 10B.

For example, the client B1 is a watcher requesting presence information of desired one of clients B2 to n being presentities from the presence server 10B, and one of clients B2 to n of which presence information has been requested by the client B1 is the presentity providing its own presence information to the presence server 10B. This is a presence service under the presence server 10B for the conventional single application B.

Presence information of the client A using the application A and presence information of the client B using the application B have different structures.

Figure 3:
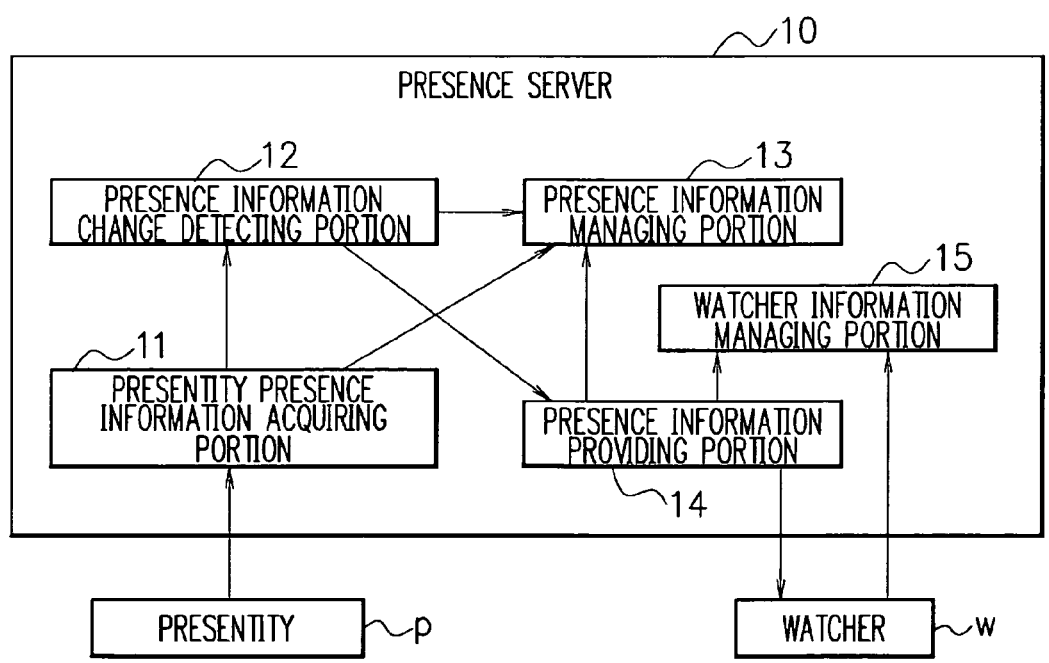
FIG. 3 shows the configuration of a presence server in the embodiment of the present invention.

Now, the configuration of the presence server 10 will be first described. As shown in FIG. 3, the presence server 10 is comprised of a presentity presence information acquiring portion 11, a presence information change detecting portion 12, a presence information managing portion 13, a presence information providing portion 14 and a watcher information managing portion 15.

The presentity presence information acquiring portion 11 has a function of acquiring presence information of a presentity P from the presentity P.

The presence information change detecting portion 12 has a function of making a comparison with the presence information recorded in the presence information managing portion 13 using as a trigger a signal indicating that the presentity presence information acquiring portion 11 has accepted input of presence information from the presentity P, and determining that a change is detected and instructing the presence information providing portion 14 to provide the presence information to a watcher W if there is a change.

The presence information managing portion 13 has a function of registering and holding the presence information of the presentity P acquired from the presentity P.

The presence information providing portion 14 has a function of receiving the trigger from the presence information change detecting portion 12, inquiring of the watcher information managing portion 15 about which watcher W should be provided with the changed presence information of the presentity P, acquiring presence information which is to be provided from the presence information managing portion 13, and providing the presence information to the watcher W.

The watcher information managing portion 15 has a function of accepting a subscription from the watcher W, and managing on which watcher W should be provided with presence information of the presentity P. For example, it manages information about a list of group members, and the like. Thus, the presence information of the presentity P is certainly provided to the watcher W at the time when the watcher W first requests presence information, and thereafter presence information may be continuously monitored and compared with the presence information recorded in the information managing portion 13, and provided to the watcher W if there is a change.

Figure 4:
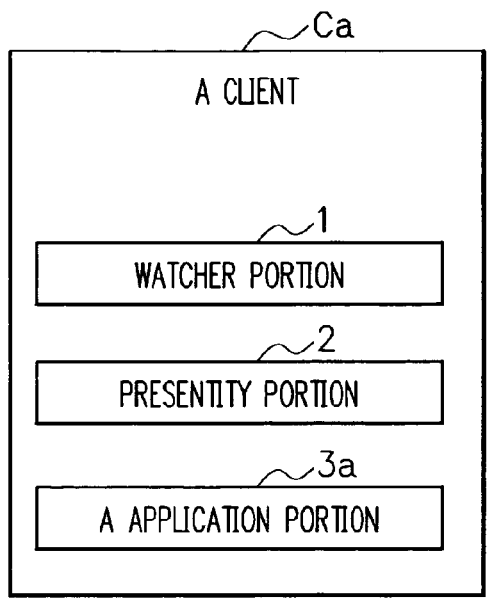
FIG. 4 shows the configuration of a client in the embodiment of the present invention.

The configuration of the client will now be described. In order to facilitate an explanation, description is presented based on the assumption that the client is a client regarding the application A, but the type of application is optional. As shown in FIG. 4, a client Ca is comprised of a watcher portion 1, a presentity portion 2 and an A application portion 3a.

The watcher portion 1 has a function of requesting presence information of a desired presentity from the presence service, and acquiring presence information from the presence service.

The presentity portion 2 has a function of providing its own presence information to the presence service.

The A application portion 3a has a function of controlling process operations of the application A.

Any client B under the presence server 10B may desire to receive the provision of presence information of any client A under the presence server 10A, and a process in this case will be described in detail below.

Figure 5:
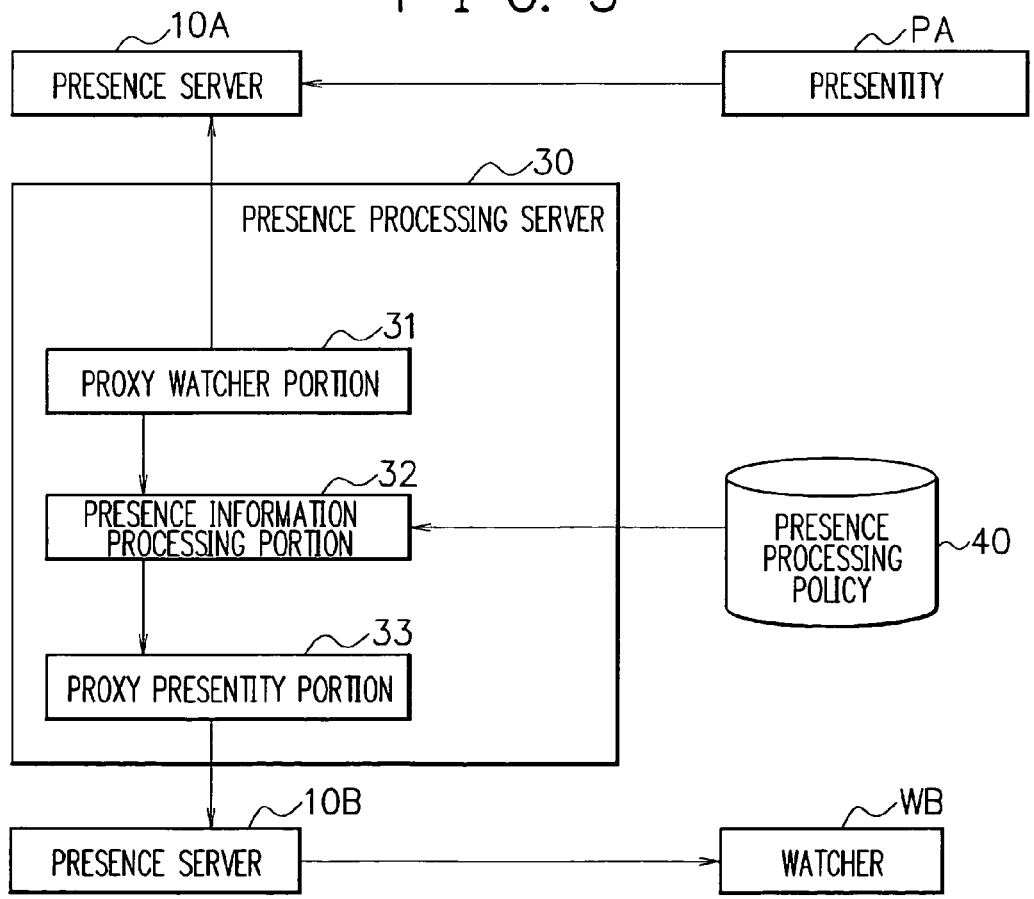
FIG. 5 shows the configuration of a presence processing server in the embodiment of the present invention.

First, the configuration of a presence processing server 30 will be described. FIG. 5 illustrates a role of the presence processing server 30 in providing presence information of the client A being the presentity PA to the client B being the watcher WB, and referring to FIG. 5, the presence processing server 30 is comprised of a proxy watcher portion 31, a presence information processing portion 32 and a proxy presentity portion 33.

The proxy watcher portion 31 has a function of receiving presence information of the presentity PA providing presence information to the presence server 10A connected to itself, from the presence server 10A, on behalf of the watcher WB. It also has a function of subscribing for the presence server 10A.

The presence information processing portion 32 has a function of receiving presence information of the presentity PA received by the proxy watcher portion 31, processing the presence information to be suitable for a presence service performed by the presence server 10B, and providing the processed presence information to the proxy presentity portion 33.

The proxy presentity portion 33 has a function of providing presence information of the presentity PA processed by the presence information processing portion 32 to the presence server 10B providing presence information of the presentity PA to the watcher WB.

Proxy watcher portions 31 and proxy presentity portions 33, the number of which corresponds to combinations of watchers WB and presentities PA requiring processing of presence information may be prepared in the presence processing server 30. In one proxy watcher portion 31 or proxy presentity portion 33, a mechanism capable of realizing the processing matching the number of the combinations may be built.

The proxy watcher portion 31 and the proxy presentity portion 33 may exist as a functional object realized by software.

A presence processing policy 40 is a conversion rule referenced by the presence information processing portion 32 when it processes presence information into a form that is easily used with a predetermined application. Processing includes, for example, passing presence information to the watcher WB in a transmitted manner, preventing presence information from being selectively passed to the watcher WB, and converting or synthesizing meanings of presence information, or changing a format of presence information. The presence processing policy 40 may be realized using a table of a database stored in a storage medium such as a HDD (Hard Disk Drive). The presence processing policy 40 may be held in the presence processing server 30, or may be stored in an external storage or the like.

The presence processing policy 40 is intended for absorbing inconsistency between information provided to the presence service by the presentity PA and information required by the watcher WB where a cellular phone or the like handling a plurality of applications of call, PTT, electronic-mails, Web access, games and the like is used, and the watcher WB using the application B on the cellular phone or the like checks the state of the presentity PA using the application A on the cellular phone or the like.

The flow of process operations will now be described with reference to FIGS. 6 and 7, but for facilitating the understanding, the description will be presented based on the assumption that the client B1 is a watcher requesting presence information of the client A1, and the client A1 is a presentity providing its own presence information. Each step of the flowchart will be abbreviated as "S".

First, the client B1 issues a request for presence information of the client A1 to the presence server 10B (S601).

Then, the presence server 10B, which has accepted the request for presence information of the client A1 from the client B1, requests the presence processing server 30 being an intermediate between the presence server 10B and the presence server 10A to provide presence information (S602).

The presence processing server 30, which has accepted the request for the provision of presence information from the presence server 10B, requests the presence server 10A to provide presence information of the client A1 (S603).

The presence server 10A, which has accepted the request for the provision of presence information of the client A1 from the presence processing server 30, provides presence information of the client A1, which is under the presence server 10A, to the processing server 30 (S604).

The presence processing server 30, which has accepted the provision of presence information of the client A1 from the presence server 10A, processes the presence information of the client A1 into a form that is easily used in the application B because presence information of the client A1 and presence information of the client B1 are different in structure (S605).

The presence processing server 30 provides the presence server 10B with presence information of the client A1 processed into a form that is easily used in the application B (S606).

The presence server 10B, which has accepted the provision of presence information of the client A1 processed into a form that is easily used in the application B from the presence processing server 30, provides the requesting client B1 with the presence information of the client A1 processed into a form that is easily used in the application B (S607).

Thus, the presence server 10B can handle the presence processing server 30 as an entity having a presentity function of providing presence information of the client A1 on behalf of the client A1 being an original presentity. That is, as shown in FIG. 6, the presence server 10B can handle the presence processing server 30 providing presence information of the client A1 being an original presentity in substitute for a client B1a being a presentity using the application B under the presence server 10B.

The presence server 10A can handle the presence processing server 30 as an entity having a watcher function of accepting the provision of presence information of the client A1 on behalf of the client B1 being an original watcher. That is, as shown in FIG. 6, the presence server 10A can handle the presence processing server 30 accepting the provision of presence information to be accepted by the client B1 being an original watcher in substitute for a client A1*b* being a watcher using the application A under the presence server 10A itself.

Figure 6:
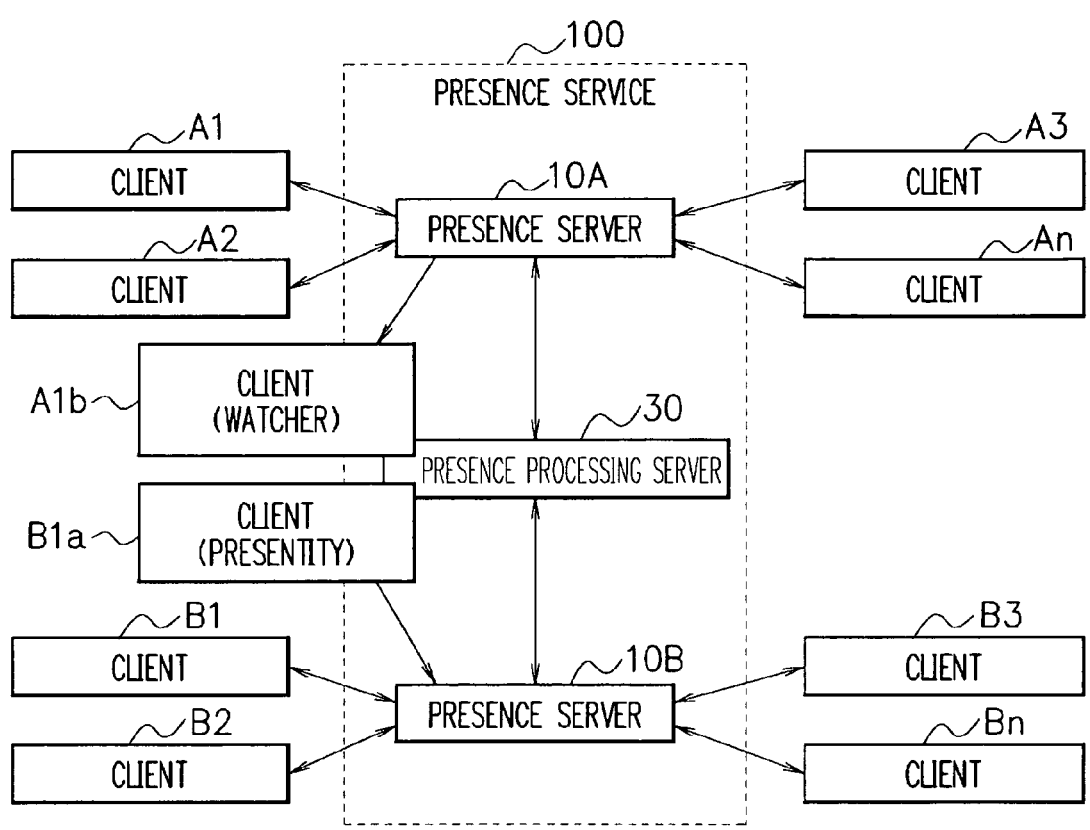
FIG. 6 shows the detailed configuration of the presence service system in the embodiment of the present invention.
Figure 7:
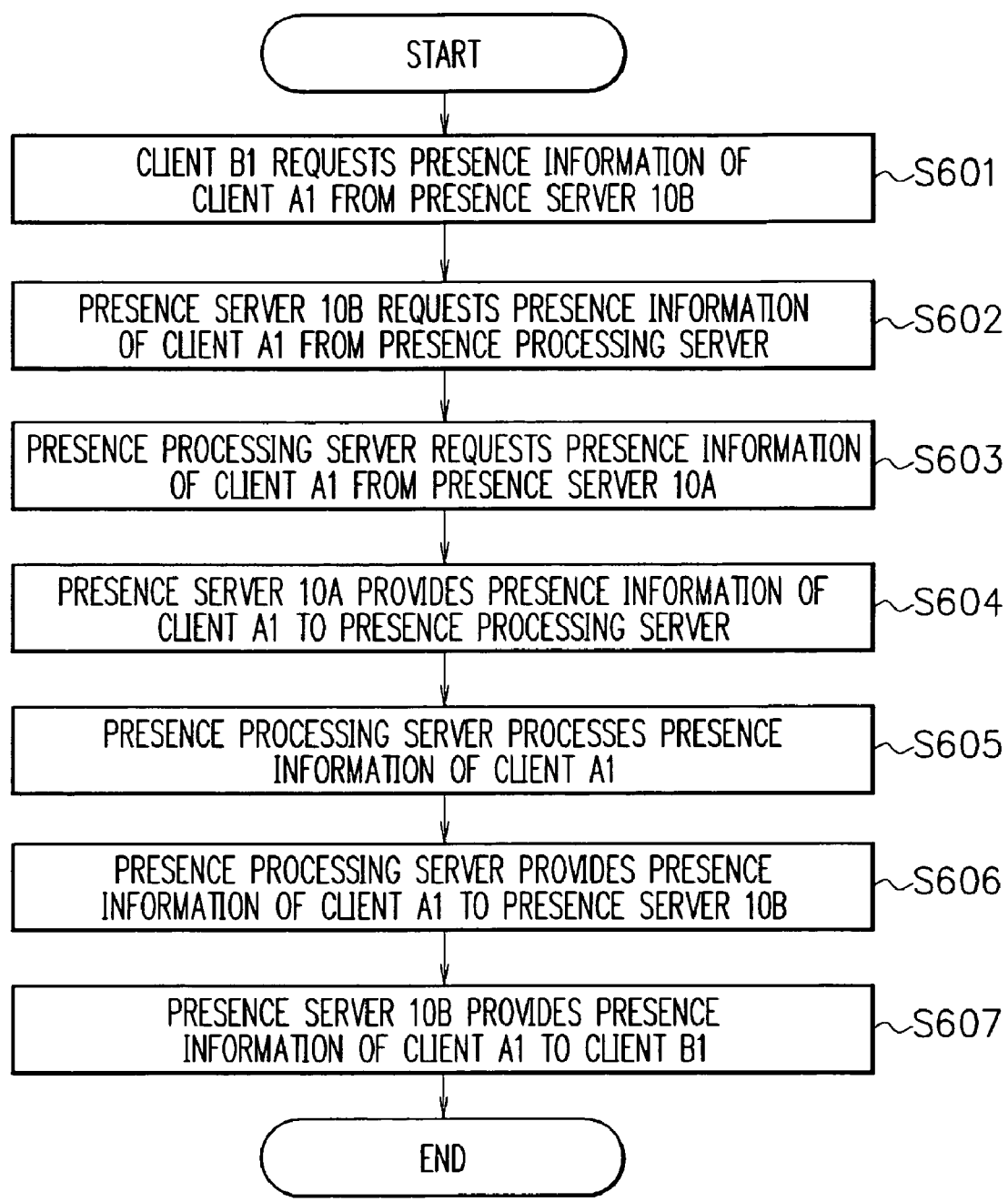
FIG. 7 is a flowchart showing a procedure of process operations of the presence processing server in the embodiment of the present invention.

Owing to the presentity function and watcher function of the presence processing server 30 described above, the presence server 10B can treat the client A1 as the client B1*a* as if it were a client using the application B under the presence server 10B itself, and the presence server 10A can treat the client B1 as the client A1*b* as if it were a client using the application A under the presence server 10A itself, as shown in FIG. 6.

Consequently, even if presence information of the client A1 using the application A and presence information of the client B1 using the application B are different in structure, presence information can be exchanged between the client A1 and the client B1 without implementing a special apparatus or function in the presence server 10A and the presence server 10B.

The above description takes as an example the case where any client B under the presence server 10B desires to receive the provision of presence information of any client A under the presence server 10A, but a similar exchange of presence information is applied to the case where any client A under the presence server 10A desires to receive the provision of presence information of any client B under the presence server 10B as a matter of course.

Example 1

A presence information providing system as a first example of the present invention will be described below with reference to the drawings. The flow of an efficient operation process in the case where the client B1 is a watcher requesting presence information of the client A1 and the client A1 is a presentity providing presence information of the client A1 itself, described with reference to FIGS. 6 and 7, will be shown.

Figure 8:
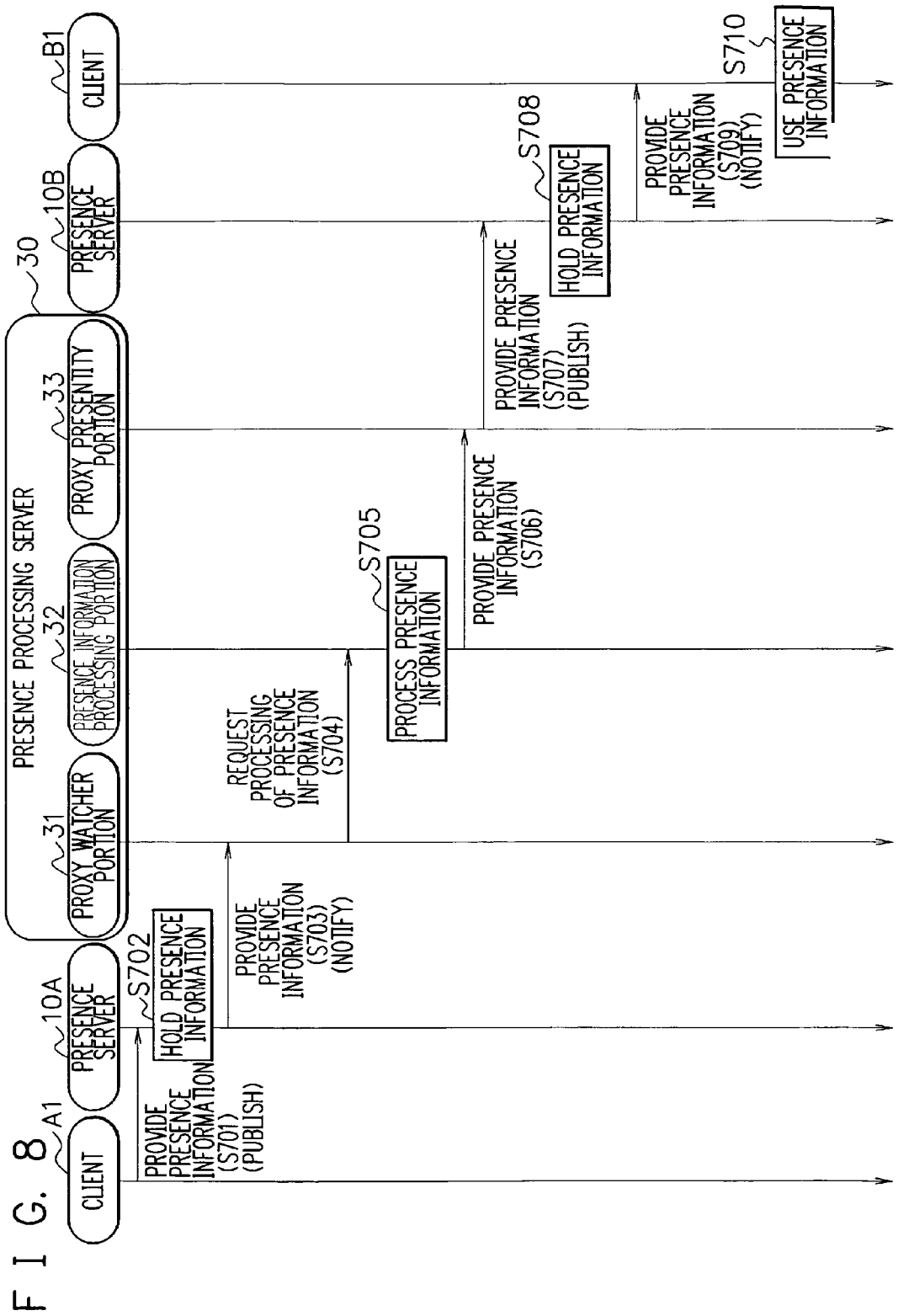
FIG. 8 is a sequence chart showing a procedure of process operations of processing presence information in the embodiment of the present invention.

Process operations when the client B1 receives the provision of presence information of the client A1 are shown in the sequence diagram of FIG. 8.

That is, the client A1 provides its presence information to the presence server 10A when the presence of the client A1 is changed (S701).

The presence server 10A holds presence information provided from the client A1 (S702), and provides presence information to all watchers watching the client A1 (S703).

The proxy watcher portion 31 in the presence processing server 30 issues a presence information processing process request to the presence information processing portion 32 along with presence information provided from the presence server 10A (S704).

The presence information processing portion 32 processes presence information provided from the proxy watcher portion 31 (S705), and provides processed presence information to the proxy presentity portion 33 (S706).

The proxy presentity portion 33 provides the presence server 10B with processed presence information provided from the presence information processing portion 32 (S707).

The presence server 10B holds processed presence information of the client A1 provided from the proxy presentity portion 33 (S708), and provides the presence information to the client B1 (S709). The client B1 uses presence information of the client A1 (S710).

In this operation process, no problem arises if the degree of change of presence information of the client A1 is small relative to the frequency with which the client B1 uses presence information of the client A1, but a presence information processing process frequently occurs, and the processes may be wasted if the degree of change of presence information of the client A1 is large relative to the frequency with which the client B1 uses presence information of the client A1. Thus, if the degree of change of presence information of the client A1 is large relative to the frequency with which the client B1 uses presence information of the client A1, the presence information processing process of the client A1 should be carried out in response to a request of the client B1 as shown in the sequence diagram of FIG. 9 for achieving process operations.

That is, the client A1 provides its presence information to the presence server 10A when the presence of the client A1 is changed (S801).

The presence server 10A holds the presence information provided from the client A1 (S802), and provides the presence information to all watchers watching the client A1 (S803).

The proxy watcher portion 31 in the presence processing server 30 holds the presence information provided from the presence server 10A, and waits until a request is made from the client B1 (S804).

If the client B1 has a situation in which presence information of the client A1 is needed (S805), the client B1 requests the presence server 10B to provide presence information of the client A1 (S806).

The presence server 10B requested to provide presence information of the client A1 from the client B1 requests the presence processing server 30 to provide presence information of the client A1 (S807).

The proxy watcher portion 31 in the presence processing server 30 requested to provide presence information of the client A1 from the presence server 10B issues a presence information processing process request to the presence information processing portion 32 along with presence information of the held client A1 (S808).

The presence information processing portion 32 processes the presence information provided from the proxy watcher portion 31 (S809), and provides processed presence information to the proxy presentity portion 33 (S810).

The proxy presentity portion 33 provides the presence server 10B with the processed presence information provided from the presence information processing portion 32 (S811).

The presence server 10B holds the processed presence information of the client A1 provided from the proxy presentity portion 33 (S812), and provides the presence information to the client B1 (S813). The client B1 uses the presence information of the client A1 (S814).

Owing to this operation process, wasteful presence information processing processes can be avoided to achieve efficient processes without providing presence information of the client A1 to the client B1 each time presence information of the client A1 is changed.

Example 2

A presence information providing system as a second example of the present invention will be described below with reference to the drawings. For facilitating understanding, exchanges of presence information regarding a specific telephone service and presence information regarding a PTT service will be described in detail, but the present invention is not limited to the presence information regarding these services.

As shown in FIG. 10, a plurality of telephone clients T are connected to a telephone presence server 10T. In this case, two telephone clients T are connected. A plurality of PTT clients P are connected to a PTT presence server 10P. In this case, four PTT clients P are connected. The presence processing server 30 is connected to the telephone presence server 10T and the PTT presence server 10P, and references the presence processing policy 40.

The telephone presence server 10T manages and provides presence information required by users using a telephone application. The presence information is information on whether it is possible or not to communicate with a partner who wants to make conversations by telephone, and specifically includes three states of "online", "offline" and "calling". Instead of these three states, two states may be adopted such that "online" is replaced by "response possible", and "offline" and "calling" are replaced by "response impossible".

The telephone client T is comprised of a watcher portion 1, a presentity portion 2 and a telephone application portion 3t. Referring to FIG. 11, a cellular phone 7 is used to achieve the system, but the present invention is not limited to the cellular phone, and an information processing apparatus having the function shown in FIG. 11, for example a personal computer, a PHS (simplified cellular phone), a cellular phone information terminal and the like may be used.

As shown in FIG. 11, the cellular phone 7 is comprised of a communication facility portion 4, a data input portion 5 and a data output portion 6.

The communication facility portion 4 has a function of exchanging presence information and the like with the presence server. Communication means may be either wired or wireless, and includes, for example, wireless LAN communication, Bluetooth, infrared communication and the like.

The data input portion 5 has a function of accepting input of data. It includes, for example, a keyboard accepting character data, a mike accepting voice data, or the like.

The data output portion 6 has a function of outputting data. It includes, for example, a screen outputting image data such as characters, static images or dynamic images, a speaker outputting voice data, or the like. A mechanism displaying data such as a screen is not an essential component, but a process that is not visually recognized by the user, such as a process within a terminal by software may be performed instead.

The PTT presence server manages and provides presence information required by a user using a PTT application. The presence information is information on whether it is possible or not to speak to a partner who wants to make conversations by PTT, and specifically includes five states of "offline", "online", "participating in session and listening to other speaker (response possible)" "participating in session and speaking (response impossible" and "busy (response impossible)". The PTT application supports a multiple session service, and the PTT client can participate in a plurality of PTT sessions.

Of these five presences, former four presences are automatically switched by the system according to the connection state of the network of the PTT client and the usage state of the PTT application. The last presence of "busy" is voluntarily set by the user of the PTT client on whether communication using the PTT application is permitted or not at the time. This setting may be made by the user or may be automatically made in conjunction with other information of a predetermined scheduler, other presence services and the like.

Figure 12:
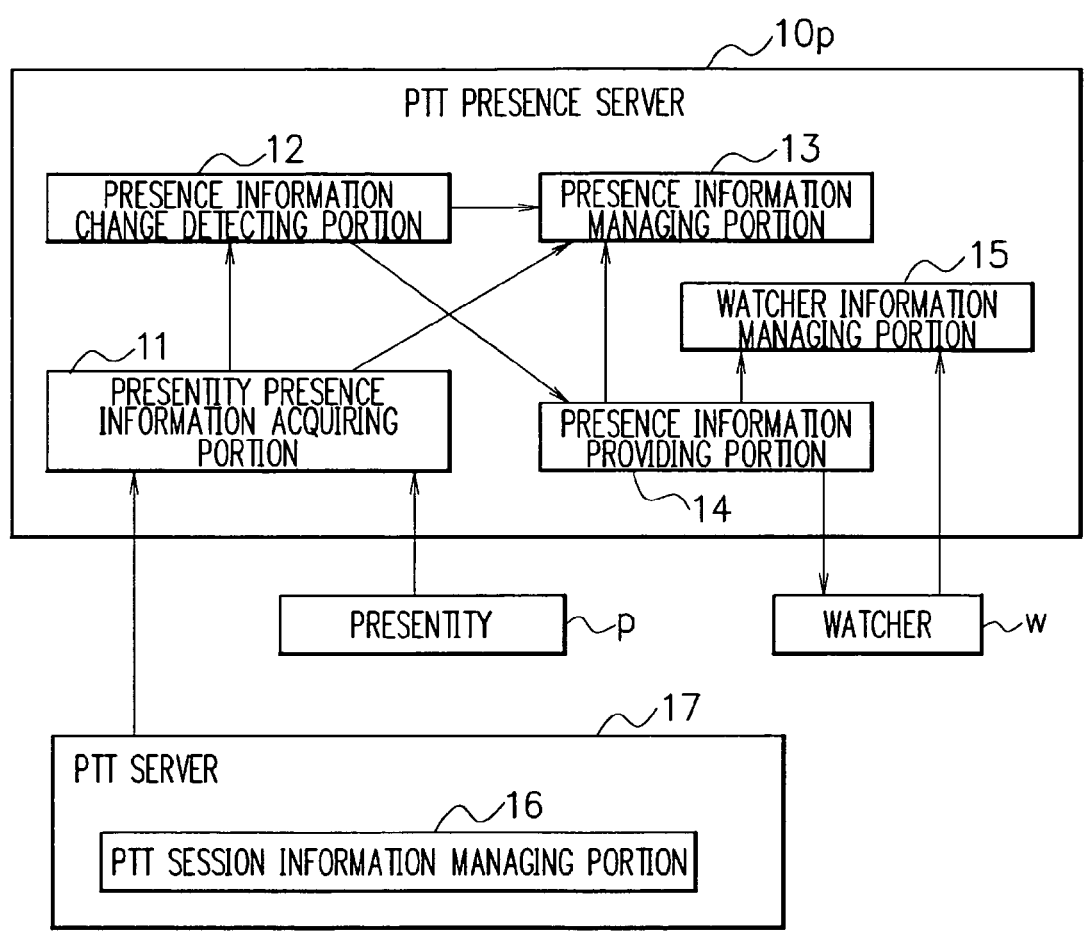
FIG. 12 shows the configuration of a PTT presence server in the second Example of the present invention.

As shown in FIG. 12, a PTT presence server 10p has, in addition to the structure of the general presence server described above, an additional interface for exchanging presence information with a PTT server.

A PTT server 17 holds and controls presence information of the PTT client participating in a session at a PTT session information managing portion 16. The PTT server 17 provides the PTT presence server 10p with presence information of the PTT client participating in the session. The PTT server 17 controls the PTT session by reference to presence information of the PTT client provided from the PTT presence server 10p. For the mechanism for controlling the PTT session, a well known technique may be used.

As shown in FIG. 13, the PTT presence server 10p may be included in the PTT server 17.

The PTT client is comprised of a watcher portion 1, a presentity portion 2 and a PTT application portion 3p. Referring to FIG. 11, a PTT-dedicated terminal 8 is used to achieve the system, but the present invention is not limited to the PTT-dedicated terminal, and an information processing apparatus having the function shown in FIG. 11, for example a personal computer, a cellular phone, a PHS (simplified cellular phone), a cellular phone information terminal and the like may be used.

As shown in FIG. 11, the PTT-dedicated terminal 8 is comprised of a communication facility portion 4, a data input portion 5 and a data output portion 6.

The communication facility portion 4 has a function of exchanging presence information and the like with the presence server. Communication means may be either wired or wireless, and includes, for example, wireless LAN communication, Bluetooth, infrared communication and the like.

The data input portion 5 has a function of accepting input of data. It includes, for example, a keyboard accepting character data, a mike accepting voice data, or the like.

The data output portion 6 has a function of outputting data. It includes, for example, a screen outputting image data such as characters, static images or dynamic images, a speaker outputting voice data, or the like. A mechanism displaying data such as a screen is not an essential component, but a process that is not visually recognized by the user, such as a process within a terminal by software may be performed instead.

The presence processing server 30 is an intermediate between the telephone presence server 10T and the PTT presence server 10P, processes each presence information into a form that is easily used by each application, and provides the presence information. The method for processing presence information is registered as the presence processing policy 40 such that it can be referenced by the presence processing server 30.

The presence processing policy 40 in this example is shown in Table 1. In Table 1, the presence processing policy 40 is provided for each direction in which presence information is exchanged, but both presence processing policies may be combined.

TABLE 1

Presence processing policy referenced when the telephone watcher receives the provision of presence information of the PTT presentity

| PTT presence | Telephone presence |
| --- | --- |
| Offline | Offline |
| Online (response possible) | Online (response possible) |
| Participating in session (listening to other speaker) (response possible) | Calling (response impossible) |

TABLE 1-continued

| | |
|---|---|
| Participating in session (speaking) (response impossible) | Calling (response impossible) |
| Busy (response impossible) | Calling (response impossible) |

Presence processing policy referenced when the PTT watcher receives the provision of presence information of the telephone presentity

| Telephone presence | PTT presence |
|---|---|
| Offline | Offline |
| Online (response possible) | Online (response possible) |
| Calling (response impossible) | Participating in session (speaking) (response impossible) |

In the case where the telephone watcher receives the provision of presence information of the PTT presentity, the telephone presence is determined to be "offline" when the PTT presence is "offline", by reference to the presence processing policy 40. When the PTT presence is "online (response possible)", the telephone presence is determined to be "online (response possible)". When the PTT presence is "participating in session (listening to other speaker) (response possible)", the telephone presence is determined to be "calling (response impossible)". When the PTT presence is "participating in session (listening to other speaker)", it means a state in which participation in a new PTT session is possible. When the PTT presence is "participating in session (speaking) (response impossible)", the telephone presence is determined to be "calling (response impossible)". When the PTT presence is "participating in session (speaking)", it means a state in which participation in a new PTT session is impossible. When the PTT presence is "busy" (response impossible)", the telephone presence is determined to be "calling (response impossible)".

In the case where the PTT watcher receives the provision of presence information of the telephone presentity, the PTT presence is determined to be "offline" when the telephone presence is "offline", by reference to the presence processing policy 40. When the telephone presence is "online (response possible)", the PTT presence is determined to be "online (response possible)". When the telephone presence is "calling (response impossible)", the PTT presence is determined to be "participating in session (speaking) (response impossible)".

The presence processing policy 40 in this example satisfies the need of the user who accepts an invitation to a new PTT session but does not want an incoming telephone call because the PTT client participating in the session can participate in a new PTT session without interrupting the existing PTT session owing to a multiple session function, but the existing PTT session must be interrupted for calling by telephone.

That is, in the PTT application supporting the multiple session service, the user A participating in the PTT session presents a state of "participating in session but possible to participate in new session" to the users of other PTT applications, whereby the users of other PTT applications can invite the user A to the PTT session. The user A can participate in a new PTT session without interrupting the existing PTT session owing to the multiple session function, but the existing PTT session must be interrupted for calling by telephone, and therefore the user A comes to have presence information of accepting no incoming telephone call by presenting a state of "rejecting incoming call" to the users of other telephone applications, although the user A accepts an invitation to the new PTT session.

Figure 14:
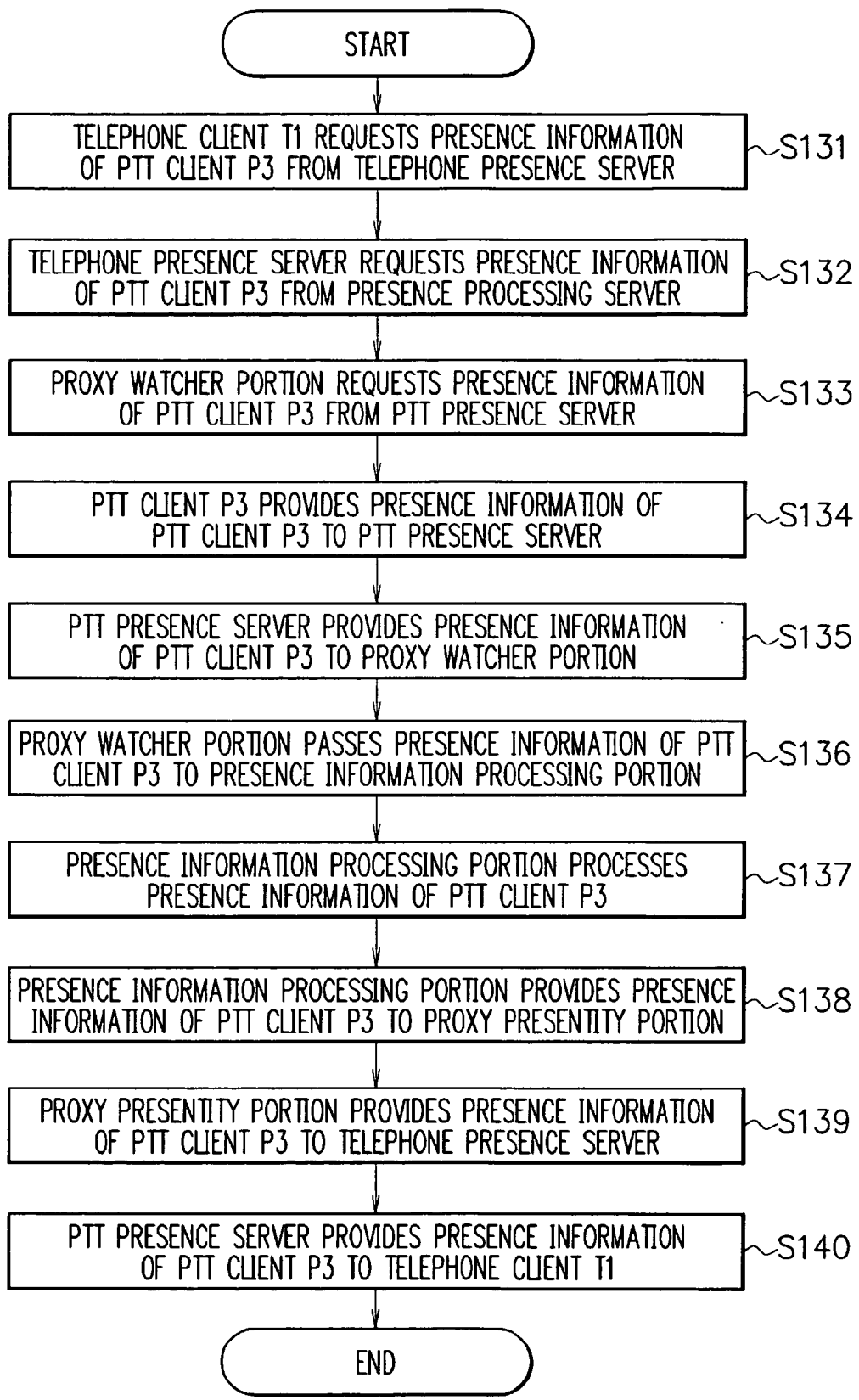
FIG. 14 is a flowchart showing a procedure of process operations of the presence processing server in the second Example of the present invention.

The flow of process operations in this example configured as described above will be described with reference to FIG. 14. Each step of the flowchart will be abbreviated as "S" in the description below.

Assume that a telephone client T1 requests presence information of the PTT client P3. There may be cases where the telephone T1 and the PTT client P3 operate on different information processing apparatuses of different users, but also taken into account are cases where they operate on one information processing apparatus used by one user.

First, the telephone client T1 requests presence information of the PTT client P3 from the telephone presence server 10T (S131). The telephone presence server 10T requests the presence information to the presence processing server 30 because presence information of the PTT client is not presence information managed by the telephone presence server 10T (S132). The proxy watcher portion 31 of the presence processing server 30 receives the request from the telephone presence server 10T and requests the PTT presence server 10P to provide presence information of the PTT client P3 (S133).

If the PTT client P3 is participating in the PTT session and the user of the PTT client P3 is just speaking, for example, presence information of "participating in session (speaking)" is provided, and if the user of the PTT client P3 is not speaking, presence information of "participating in session (listening to other speaker" is provided to the PTT presence server 10P (S134), and the proxy watcher portion 31 of the presence processing server 30 monitoring the PTT presence server 10P on behalf of the telephone client T1 acquires presence information of the PTT client P3 from the PTT presence server 10P (S135).

At this time, for the telephone client T1 expected to receive the provision of presence information of the PTT client P3, similar presence information of a PTT client P3 is provided to the proxy watcher portion 31 prepared in the presence processing server 30. This is because for the PTT presence server 10P, the proxy watcher portion 31 in the presence processing server 30 is also registered in the watcher information managing portion 15, as is the watcher function of other PTT client, to receive the provision of presence information of the PTT client P3.

If the presence of the PTT client P3 is changed, presence information of the PTT client P3 managed by the PTT presence server 10P is of "participating in session (speaking)" or "participating in session (listening to other speaker)" when the PTT client P3 participates in any PTT session, for example, and the presence processing server 30 monitoring the PTT presence server 10P on behalf of the telephone client T1 may acquire presence information of the PTT client P3.

When the proxy watcher portion 31 of the presence processing server 30 acquires presence information of the PTT client P3, it immediately passes the presence information to the presence information processing portion 32 (S136). The presence information processing portion 32 processes presence information by reference to the presence processing policy 40 shown in Table 1 (S137), and provides processed presence information to the proxy presentity portion 33 (S138). The presence processing policy 40 referenced during processing is the "processing policy referenced when the telephone watcher receives the provision of presence information of the PTT presentity" in Table 1. The proxy presentity portion 33 provides provided presence information to the telephone presence server 10T (S139). The telephone presence server 10T provides provided presence information to the telephone client T1 (S140), In this way, the telephone client 2 receives the provision of presence information of the PTT client P3.

As described above, presence information of the PTT client P3 specifically involves information of "(listening to other speaker)" and "(speaking)", but on the telephone application side, the presence processing policy 40 is set so as to determine that an incoming telephone call cannot be got in either case. Accordingly, the telephone presence server 10T provides the telephone client T1 with a presence indicating that the PTT client P3 is "calling", and the user of the telephone client T1 understands that the user of the PTT client P3 cannot get an incoming telephone call.

PTT clients 1, 2 and 4 referencing presence information of the PTT presence server 10P receive the provision of presence information of the PTT client P3 at the specific levels of "participating in session (listening to other speaker)" and "participating in session (speaking)". This is because the PTT application permits one client to participate in a plurality of sessions.

According to the example described above, when information possessed by one presence server is provided to another presence server, the presence processing server 30 processes presence information into a form that is easily used by an application on the presence server to which the presence information is provided, and provides the same, thus making it possible to provide presence information which is easily used, which matches the feature of each application.

Example 3

The case where presence information of the PTT application and presence information of an instant message (IM) application are linked by the presence processing server 30 will be described with reference to FIG. 15. This example is similar in a basic configuration to Example 2, but is different in the presence processing policy 40 referenced by the presence processing server 30, and the presence processing policy 40 in this example is shown in Table 2. In Table 2, the presence processing policy 40 is provided for each direction in which presence information is exchanged, but both presence processing policies may be combined.

TABLE 2

Presence processing policy referenced when the instant message watcher receives the provision of presence information of the PTT presentity

| PTT presence | Instant message presence |
| --- | --- |
| Offline | Offline |
| Online (response possible) | Online (response possible) |
| Participating in session (listening to other speaker) (response possible) | Online (response possible) |
| Participating in session (speaking) (response impossible) | Leaving the seat (response impossible for a while) |
| Busy (response impossible) | Busy (response impossible) |

Presence processing policy referenced when the PTT watcher receives the provision of presence information of the instant message presentity

| Instant message presence | PTT presence |
| --- | --- |
| Offline | Offline |
| Online (response possible) | Online (response possible) |
| Leaving the seat (response impossible for a while) | Participating in session (speaking) (response impossible) |
| Busy (response impossible) | Busy (response impossible) |

In the case where an instant message watcher receives the provision of presence information of the PTT presentity, an instant message presence is determined to be "offline" when the PTT presence is "offline", by reference to the presence processing policy 40. When the PTT presence is "online (response possible)", the instant message presence is determined to be "online (response possible)". When the PTT presence is "participating in session (listening to other speaker) (response possible)", the instant message presence is determined to be "online (response possible)". When the PTT presence is "participating in session (speaking) (response impossible)", the instant message presence is determined to be "leaving the seat (response impossible for a while)". When the PTT presence is "busy (response impossible)", the instant message presence is determined to be "busy (response impossible)".

In the case where the PTT watcher receives the provision of presence information of the instant message presentity, the PTT presence is determined to be "offline" when the instant message presence is "offline", by reference to the presence processing policy 40. When the instant message presence is "online (response possible)", the PTT presence is determined to be "online (response possible)". When the instant message presence is "leaving the seat (response impossible for a while)", the PTT presence is determined to be "participating in session (speaking) (response impossible)". When the instant message presence is "busy (response impossible)", the PTT presence is determined to be "busy (response impossible)".

The presence processing policy 40 in this example satisfies the need of the user who wants to notify the instant message client that the PTT client participating in the session can participate in a new PTT session without interrupting the existing PTT session owing to a multiple session function, but participation in the instant message session may cause delay of a response although it is not necessary to interrupt the existing PTT session. If the instant message client leaving the seat is invited to a new instant message session, the presence processing policy 40 satisfies the need of the user who wants to present a state of "response impossible" to the PTT client because the instant message client is notified that an immediate response is impossible, but such a presence does not exist in the PTT service.

That is, in the PTT application supporting the multiple session service, the user A participating in the PTT session presents a state of "participating in session but possible to participate in new session" to the users of other PTT applications, whereby the users of other PTT applications can invite the user A to the PTT session. The user A can participate in a new PTT session without interrupting the existing PTT session owing to the multiple session function, but the instant message application may cause delay of a response although it is not necessary to interrupt the existing PTT session, and therefore the user A can have presence information indicating that reception of an instant message is accepted but a response is impossible, by presenting a state of "leaving the seat" to the users of other instant message applications.

In the instant message application supporting the multiple session service, the user B leaving the seat at an instant message client terminal presents a state of "leaving the seat" to the users of other instant message applications, whereby the users of other instant message applications can invite the user B to the instant message session, but can understand that an immediate response from the user B cannot be expected. For the invitation of the user B to a new PTT session, response time expected by the users of other PTT applications may not be ensured because the user B is "leaving the seat", and therefore the user B can have presence information indicating that participation in the PTT session is impossible by presenting a state of "participating in session (response impossible)", which represents the most appropriate communication possible/impossible state, to users of other PTT applications, although the user B does not actually participate in the session.

Example 4

The case where presence information of the PTT application and presence information of a game application are linked by the presence processing server 30 will be described with reference to FIG. 16. This example is similar in basic configuration to Example 2, but is different in the presence processing policy 40 referenced by the presence processing server 30, and the presence processing policy 40 in this example is shown in Table 3. In Table 3, the presence processing policy 40 is provided for each direction in which presence information is exchanged, but both presence processing policies may be combined.

TABLE 3

| Presence processing policy referenced when the game A watcher receives the provision of presence information of the PTT presentity | |
|---|---|
| PTT presence | Game A presence |
| Offline | Offline |
| Online (response possible) | Online (response possible) |
| Participating in session (listening to other speaker) (response possible) | Participating in session (response impossible) |
| Participating in session (speaking) (response impossible) | Participating in session (response impossible) |
| Busy (response impossible) | Participating in session (response impossible) |

| Presence processing policy referenced when the PTT watcher receives the provision of presence information of the game A presentity | |
|---|---|
| Game A presence | PTT presence |
| Offline | Offline |
| Online (response possible) | Online (response possible) |
| Participating in session (response possible) | Participating in session (listening to other speaker) (response possible) |
| Participating in session (response impossible) | Participating in session (speaking) (response impossible) |

This example will be described abstractly showing a game A and defining its presence information, but presence information of game applications includes, for example, games for which the real-time nature is particularly required, such as drive games or shooting games, and games for which the real-time nature is not essential but the user does not like permission of interruption in a predetermined part in a scenario from other part, the presence information thus varies depending on individual games due to the nature of the game scenario, and therefore all games do not necessarily employ same structures of presence information.

In the case where the game A watcher receives the provision of presence information of the PTT presentity, a game A presence is determined to be "offline" when the PTT presence is "offline", by reference to the presence processing policy 40. When the PTT presence is "online (response possible)", the game A presence is determined to be "online (response possible)". When the PTT presence is "participating in session (listening to other speaker) (response possible)", the game A presence is determined to be "participating in session (response impossible)". This means the priority of the PTT application is set to be higher than the priority of the game A according to a setting by the user. When the PTT presence is "participating in session (speaking) (response impossible)", the game A presence is determined to be "participating in session (response impossible)". When the PTT presence is "busy (response impossible)", the game A presence is determined to be "participating in session (response impossible)".

In the case where the PTT watcher receives the provision of presence information of the game presentity, the PTT presence is determined to be "offline" when the game A presence is "offline", by reference to the presence processing policy 40. When the game A presence is "online (response possible)", the PTT presence is determined to be "online (response possible)". When the game A presence is "participating in session (response possible)", the PTT presence is determined to be "participating in session (listening to other speaker) (response possible)". This means that the priority of the PTT application is set to be equal to or higher than the priority of the game A according to a setting by the user. When the game A presence is "participating in session (response impossible)", the PTT presence is determined to be "participating in session (speaking) (response impossible)".

The presence processing policy 40 in this example satisfies the need of the user who accepts an invitation to a new PTT session but does not want reception of the game A because if the PTT client participating in the session is invited to a new PTT session, the PTT client can participate without interrupting the existing PTT session owing to a multiple session function, but the existing PTT session must be interrupted for inviting the PTT client participating in the session to a game A session. If a game A client participating in the session is invited to a new PTT session, the game A client may be in the state of response possible when seen from the PTT client as long as it is in the state of response possible when seen from other game A clients.

That is, in the PTT application supporting the multiple session service, the user A participating in the PTT session presents a state of "participating in session but possible to participate in new session" to users of other PTT applications, whereby the users of other PTT applications can invite the user A to the PTT session. The user A can participate in a new PTT session without interrupting the existing PTT session owing to the multiple session function, but the existing PTT session must be interrupted for inviting the PTT client participating in the session to the game A session, and therefore the user A can have presence information of accepting no reception of the game A by presenting the state of "participating in session (response impossible)" to the users of other game A applications, although the user A accepts an invitation to the new PTT session.

Example 5

The case where presence information of a user group with a high frequency of change of the presence during the game and presence information of the other group are linked when a game presence server is divided according to the frequency of change of the presence information of game clients and managed in a game application scenario will be described with reference to FIG. 17.

Assume that the game application is a game B. This example is similar in basic configuration to Example 2, but it is comprised of a game B stage Y presence server 10Gy managing presence information of game clients participating in a specific stage in a game scenario, a game B stage X presence server 10Gx managing presence information of other game clients, and a presence processing server 30. The presence processing policy 40 referenced by the presence processing server 30 is shown in Table 4. In Table 4, the presence processing policy 40 is provided for each direction in which presence information is exchanged, but both presence processing policies may be combined.

In the case where the watcher participating in a stage X with a low frequency of change of the presence during the game B receives the provision of presence information of the presentity participating in a stage Y with a high frequency of change of the presence, a game B stage X presence is determined to be "offline" when a game B stage Y presence is "offline", by reference to the presence processing policy 40. When the game B stage Y presence is "online: stage Y suspended (response possible)", the game B stage X presence is determined to be "online (response possible)". When the game B stage Y presence is "participating in stage Y: state 1 (response possible for other stage Y participants)", the game B stage X presence is determined to be "participating in stage Y (response impossible)". When the game B stage Y presence is "participating in stage Y: state 2 (response possible for other stage Y participants), the game B stage X presence is determined to be "participating in stage Y (response impossible)". When the game B stage Y presence is "participating in stage Y: state 3 (response possible for other stage Y participants)", the game B stage X presence is determined to be "participating in stage Y (response impossible)". When the game B stage Y presence is "participating in stage Y: state 4 (response impossible)", the game B stage X presence is determined to be "participating in stage Y (response impossible)".

In the case where the watcher participating in the stage X with a low frequency of change of the presence during the game B receives the provision of presence information of the presentity participating in the stage Y with a high frequency of change of the presence, the game B stage Y presence is

TABLE 4

Presence processing policy referenced when the watcher participating in stage X with a low frequency of change of the presence during game B receives the provision of presence information of the presentity participating in stage Y with a high frequency of change of presence

| Game B stage Y presence | Game B stage X presence |
| --- | --- |
| Offline | Offline |
| Online: stage Y suspended (response possible) | Online (response possible) |
| Participating in stage Y: state 1 (response possible for other stage Y participants) | Participating in stage Y (response impossible) |
| Participating in stage Y: state 2 (response possible for other stage Y participants) | Participating in stage Y (response impossible) |
| Participating in stage Y: state 3 (response possible for other stage Y participants) | Participating in stage Y (response impossible) |
| Participating in stage Y: state 4 (response impossible) | Participating in stage Y (response impossible) |

Presence processing policy referenced when the watcher participating in stage X with a low frequency of change of the presence during game B receives the provision of presence information of the presentity participating in stage Y with a high frequency of change of the presence

| Game B stage X presence | Game B stage Y presence |
| --- | --- |
| Offline | Offline |
| Online: stage X suspended (response possible) | Online (response possible) |
| Participating in stage X (response possible) | Participating in stage X (response possible) |
| Participating in stage X (response impossible) | Participating in stage X (response impossible) |

Items of "participating in stage Y: states 1 to n (n is any positive integer)" are included in Table 4, and these states 1 to n are states set on the game scenario, and are arbitrarily set by a game author. These states 1 to n are changed with a high frequency, e.g. changed in several seconds, while the game progresses, and therefore in consideration of a load on the presence server, the game B stage X presence server 10Gx other than participants who do not belong to the stage Y during the same game is prepared.

determined to be "offline" when the game B stage X presence is "offline", by reference to the presence processing policy 40. When the game B stage X presence is "online: stage X suspended (response possible)", the game B stage Y presence is determined to be "online (response possible)". When the game B stage X presence is "participating in stage X (response possible)", the game B stage Y presence is determined to be "participating in stage X (response possible)". When the game B stage X presence is "participating in stage X (response impossible)", the game B stage Y presence is determined to be "participating in stage X (response impossible)".

In the presence processing policy 40 in this example, when the proxy presentity portion 33 in the presence processing server 30 receives the provision of presence information with a high frequency of change from the game B stage Y presence server 10Gy, the presence information processing portion 32 converts presence information for the game B stage X presence server 10Gx by reference to the presence processing policy 40, but if the result of the conversion is identical to presence information set in the presence information managing portion 13 at that time, presence information which is new but has same contents is not provided to the proxy presentity portion 33, whereby the frequency with which the proxy presentity portion 33 provides presence information to the game B stage X presence server 10Gx is reduced to satisfy the need to reduce a communication load.

Example 6

In the embodiment or each example described above, description has been presented based on a configuration realized on the assumption that the presence server B receives the provision of relevant presence information from the known presence processing server 30 when the presence server B provides presence information of the client A to the application client B. This example shows a method of solution when the presence processing server 30 from which presence information of the client A is provided is not known when the presence server B provides presence information of the client A.

Referring to FIG. 18, the presence server 10B receives a subscription regarding acquirement of presence information of the client A from any client B, then makes an inquiry to a presence processing server information providing service 34, and obtains location information of an appropriate presence processing server 30 for receiving the provision of relevant presence information. Thereafter, the presence server 10B makes a setting for receiving the provision of presence information between itself and the presence processing server 30.

The presence processing server information providing service 34 may be realized using a technique such as a known DHCP (Dynamic Host Configuration Protocol) server or service location protocol (SLP: Service Location Protocol RFC 2608).

As another method, the presence server 10B receives a subscription regarding acquirement of presence information of the client A from any client B, and then requests the presence processing server information providing service 34 to "issue to an appropriate presence processing server 30 a request for making a setting for providing presence information relevant to the presence server 10B for receiving the provision of relevant presence information". The presence processing server information providing service 34 receives the request and requests the appropriate presence processing server 30 to "make a setting for providing presence information of the client A to the presence server 10B". The presence processing server 30 prepares within itself the proxy watcher portion 31, the proxy presentity portion 33 and the presence information processing portion 32, and subscribes to the presence server 10B from the proxy presentity portion 33 as the client A. The presence server 10B may interpret the subscription from the proxy presentity portion 33 as a setting completion notification from the presence processing server 30 which has made the request to the presence processing server information providing service 34, and provide presence information of the client A to the client B.

Example 7

Figure 19:
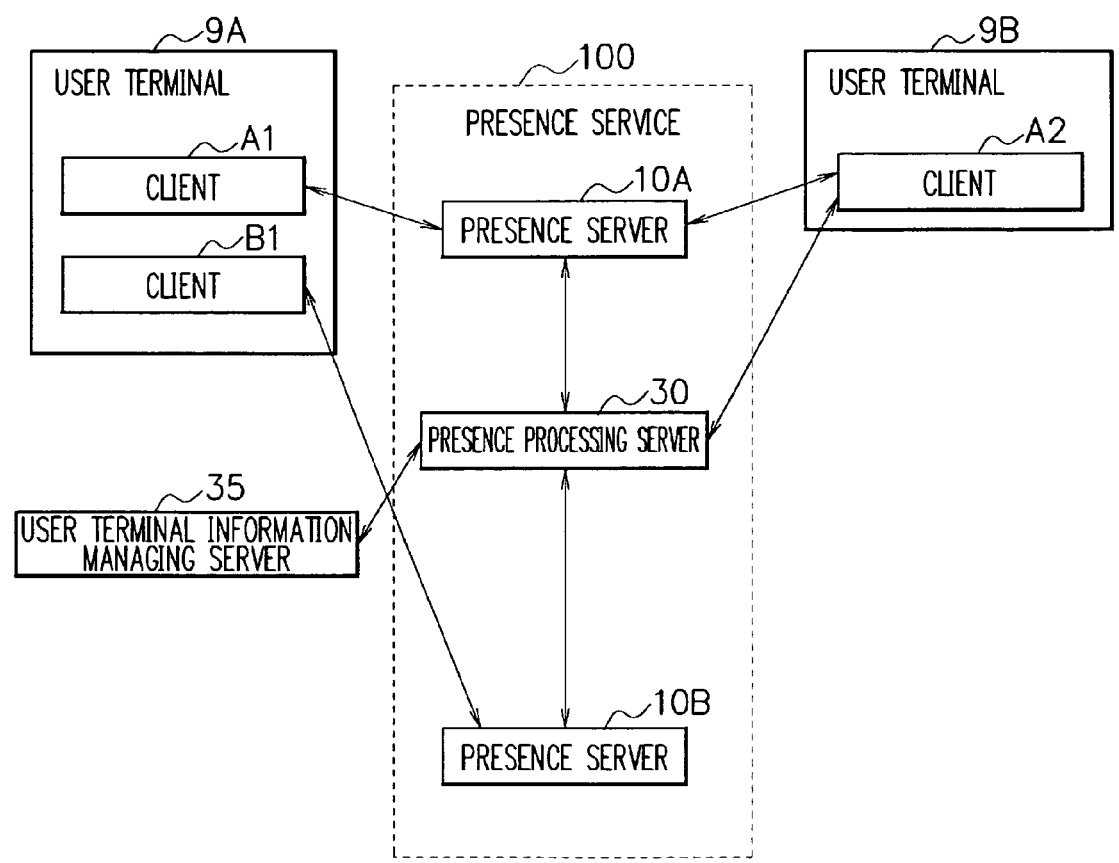
FIG. 19 shows the configuration of the presence service system in the seventh Example of the present invention.

A method of routing the provision of presence information between a user terminal 9A having a plurality of different application clients in the same terminal and a user terminal 9B having only a single application client in the terminal will be described with reference to FIG. 19.

In the case where the user terminal 9B including therein a client A2 receives the provision of presence information of an application included in the user terminal 9A, the client A2 first issues to the presence processing server 30 a subscription for receiving the provision of presence information of the user terminal 9A. The presence processing server 30 inquires of the user terminal information managing server 35 about application client information possessed by the user terminal 9B, and thereby knows that the user terminal 9A has the client A1 and the client B1. The presence processing server 30 makes a setting so as to receive presence information of the client B1 between itself and the presence server 10B, and simultaneously requests the presence server 10A to provide the client A2 with presence information of the client A1 and processed presence information of the client B1, the provision of which the presence processing server 30 has received from the presence server 10B on behalf of the client A2.

After a setting regarding routing for passing presence information is made as described above, presence information of the client A1 and presence information of the client B1 processed by the presence processing server 30 are provided from the presence server 10A to the client A2.

According to the example described above, the client A2 can execute subscriptions for receiving the provision of presence information of both the client A1 and the client B1 at a time.

The provision of presence information of the user terminal 9A including therein a plurality of application clients is received collectively, whereby in the case where the user terminal 9A uses the application B but does not use the application A, there may be a situation in which the user terminal 9A cannot use the application if the presence of the client A1 alone is "response possible" but the presence of the client B1 is "response impossible", or the user terminal 9A supposedly cannot use the application A, and in such a situation, the user terminal 9B can refrain from accessing the user terminal 9A using the application A.

Example 8

In the embodiment or each example described above, a system having a configuration in which one presence processing server 30 is an intermediate between two application presence servers has been described, but here a system having a configuration in which one presence processing server 30 is an intermediate between presence servers of a plurality of applications via a network will be described with reference to FIG. 20.

Figure 20:
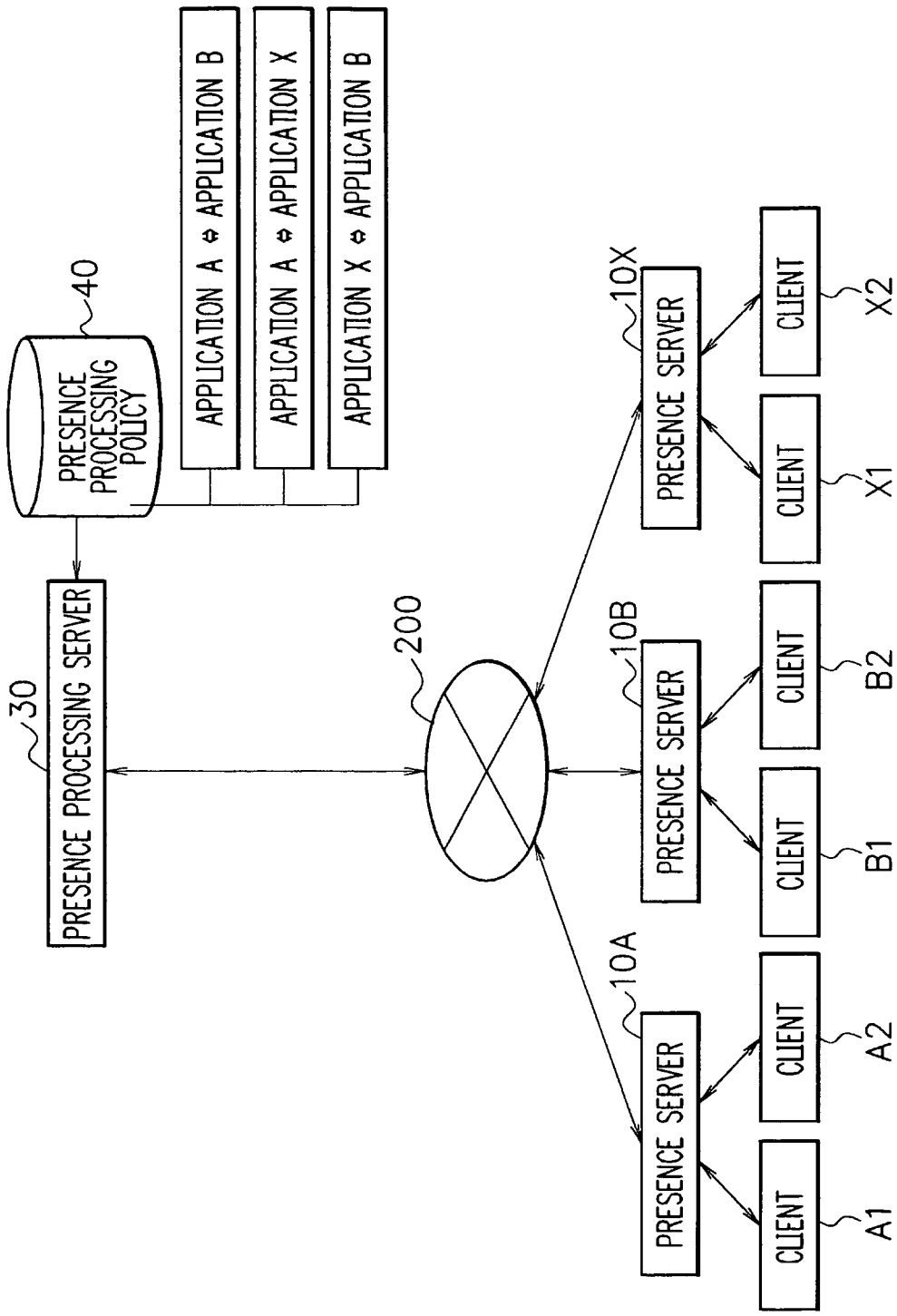
FIG. 20 shows the configuration of the presence service system in the eighth Example of the present invention.

For the presence processing policy 40 referenced by the presence processing server 30, in this example, presence processing policies between the two application presence servers are prepared according to the number of combinations of applications, for example, as conversion tables, as shown in FIG. 20.

If presence information is provided between any application clients via the presence processing server 30, a suitable conversion table of the presence processing policy 40 is referenced. For appropriately referencing the conversion table of the presence processing policy 40, for example, an application may be specified based on identification data for uniquely identifying the application received by the presence processing server 30 from the presence server of each application.

Example 9

In the embodiment and each example described above, a system processing one application presence into a different application presence has been described, but here a system having a configuration in which there is a generic presence server 50 referenced by the presence processing server 30 whenever it carries out a presence processing process will be described with reference to the drawings.

Figure 21:
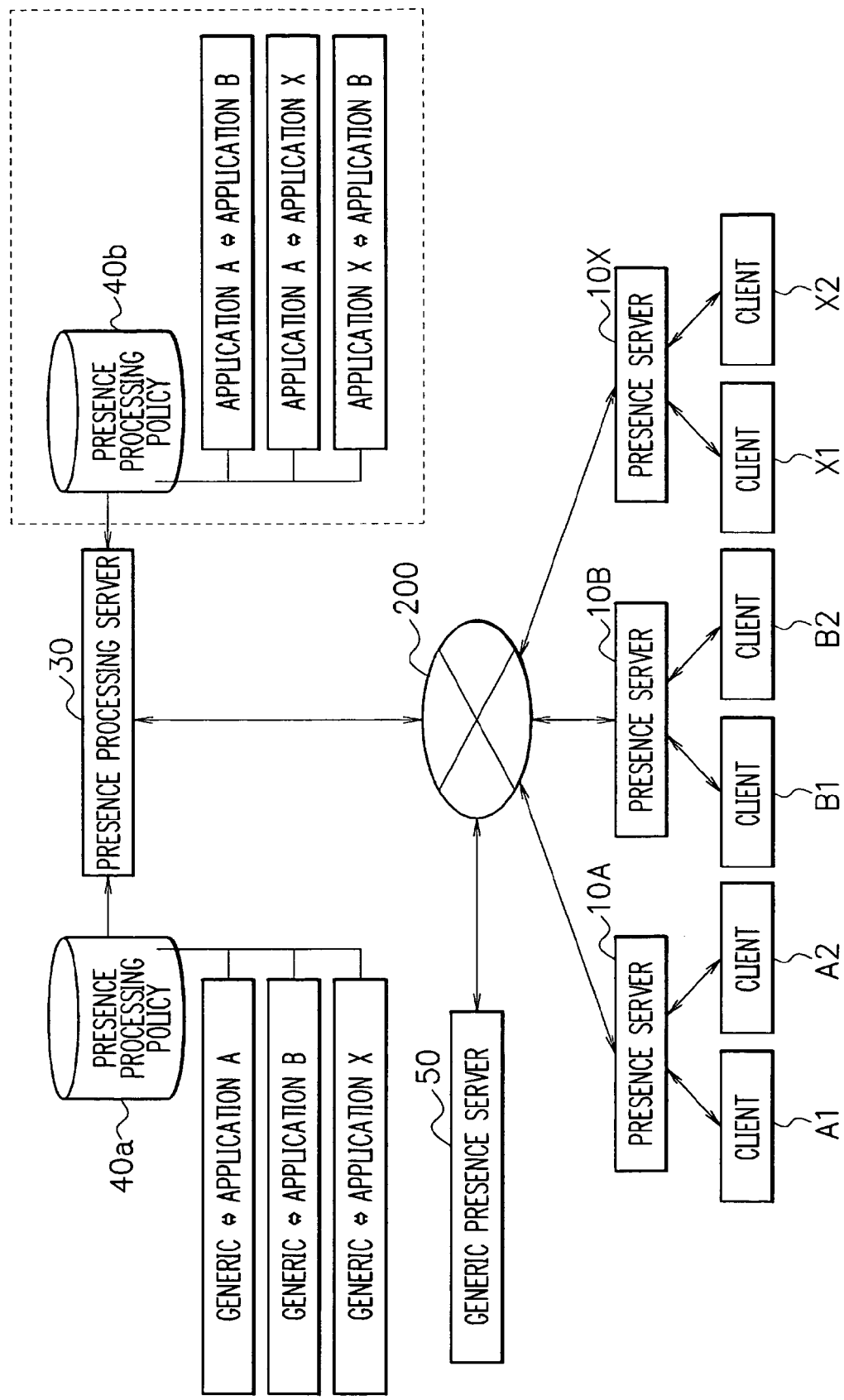
FIG. 21 shows the configuration of the presence service system in the ninth Example of the present invention.

As shown in FIG. 21, the presence server 10A, the presence server 10B and the presence server 10X, the presence processing server 30 and the generic presence server 50 are connected to one another via a network 200.

The generic presence server 50 has a function of holding presence information, which serves as a base for the user of the presence service, covering the entire presence service.

Presences of basic behavioral states of the user include, for example, states of "at work", "out of work, i.e. on private time", "in conference", "at table", "in bed", "driving" and "aboard train". The presence information also includes basic location information of the user such as "in service area of expressway" and "in hospital". Such presence information is qualitatively different from application presence information.

The generic presence server 50 holds the state and capability of a communication facility portion of a user terminal used by the user, a data input portion or a data output portion, and prohibited items, prioritized items and the like according to laws, regimes and the like, and may be used in a form in which presence information is mapped into attributes as a basis for deriving the presence information in a processing policy 40a.

An exchange of presence information between the client A1 being a presentity and the client B1 being a watcher will be described specifically with reference to FIG. 21. First, the presence processing server 30 processes presence information of the application A of the client A1 into a generic presence by reference to the presence processing policy 40a, and then the presence processing server 30 processes presence information of the application A processed into the generic presence into presence information of the application B of the client B1 by reference to the presence processing policy 40a. Thus, by providing the generic presence server 50, when a new application presence is added to the presence service, for example, the application presence can be linked to other application presences via the generic presence as long as the presence processing policy 40a between itself and the generic presence server 50 is prepared, even if a presence processing policy 40b does not exist for each of a plurality of partner application presences with which presence information is exchanged by processing presence information. For eliminating a difference in accuracy of the presence processing policy 40a resulting from the linkage via the generic presence, some or all application presence servers may be directly linked to directly process the presence between application presences irrespective of existence of the generic presence server 50.

The configuration and operation where presence information of the PTT application and presence information held by the generic presence server 50 are linked by the presence processing server 30 will be described below with reference to FIG. 22. An "aboard state presence" of the user on a car and a "location presence" of the car, which are presence information held by the generic presence server 50, are added to presence information provided by any PTT client Cp being the PTT presentity, and the resultant presence information is processed into presence information provided to another PTT client Cp being the PTT watcher.

As shown in FIG. 22, the PTT client server 10P is comprised of a client-provided presence information holding portion 37 and a processed presence information holding portion 38. The client-provided presence information holding portion 37 has a function of holding presence information provided by any PTT client Cp in its original condition. The processed presence information holding portion 38 has a function of holding presence information processed by the presence processing server 30, which is provided to another PTT client Cp or another application presence server.

As shown in FIG. 22, the presence processing server 30 is comprised of the proxy watcher portion 31, the presence information processing portion 32 and the proxy presentity portion 33. The proxy watcher portion 31 references presence information of the generic presence server 50 and the client-provided presence information holding portion 37 in the PTT presence server 10P. The proxy presentity portion 33 provides presence information processed by the presence processing server 30 to the processed presence information holding portion 38 of the PTT presence server 10P.

The presence processing policy 40a referenced by the presence processing server 30 is shown in Table 5. Presence information represented by "*" in Table 5 represents any presence information, and means that the "aboard state presence" or "location presence" thereof has no influence on PTT presence information with which the PTT watcher is provided.

TABLE 5

Presence processing policy referenced when the PTT watcher receives presence information of the PTT presentity with aboard state presence information and location presence information added thereto

| Aboard state presence | Location presence | Presence of PTT presentity | PTT presence with which PTT watcher is provided |
|---|---|---|---|
| * | * | Offline | Offline |
| Aboard (driving) | Traveling | Online | Busy (response impossible) |
| | | Participating in session (response possible) | Busy (response impossible) |
| | | Participating in session (response impossible) | Busy (response impossible) |
| | | Busy (response impossible) | Busy (response impossible) |

TABLE 5-continued

Presence processing policy referenced when the PTT watcher receives
presence information of the PTT presentity with aboard
state presence information and location presence information added thereto

| Aboard state presence | Location presence | Presence of PTT presentity | PTT presence with which PTT watcher is provided |
|---|---|---|---|
| Aboard (temporarily stopping) | Intersection | Online (response possible) | Participating in session(response impossible) |
| | | Participating in session (response possible) | Participating in session (response impossible) |
| | | Participating in session (response impossible) | Participating in session (response impossible) |
| | | Busy (response impossible) | Busy (response impossible) |
| Aboard (parking) | Parking site | Online (response possible) | Online (response possible) |
| | | Participating in session (response possible) | Participating in session (response possible) |
| | | Participating in session (response impossible) | Participating in session (response impossible) |
| | | Busy (response impossible) | Busy (response impossible) |
| Aboard (riding together) | * | Online (response possible) | Online (response possible) |
| | | Participating in session (response possible) | Participating in session (response possible) |
| | | Participating in session (response impossible) | Participating in session (response impossible) |
| | | Busy (response impossible) | Busy (response impossible) |

When the aboard state presence is "*", the location presence is "*", and the PTT presence is "offline", the PTT presence with which the PTT watcher is provided is determined to be "offline".

When the aboard state presence is "aboard (driving)", the location presence is "traveling", and the presence of the PTT presentity is "online", the PTT presence with which the PTT watcher is provided is determined to be "busy (response impossible)". When the presence of the PTT presentity is "participating in session (response possible)", the PTT presence with which the PTT watcher is provided is determined to be "busy (response impossible)". When the presence of the PTT presentity is "participating in session (response impossible)", the PTT presence with which the PTT watcher is provided is determined to be "busy (response impossible)". When the presence of the PTT presentity is "busy (response impossible)", the PTT presence with which the PTT watcher is provided is determined to be "busy (response impossible)".

When the aboard state presence is "aboard (temporarily stopping)", the position presence is "intersection", and the presence of the PTT presentity is "online (response possible)", the PTT presence with which the PTT watcher is provided is determined to be "participating in session (response impossible)". When the presence of the PTT presentity is "participating in session (response possible), the PTT presence with which the PTT watcher is provided is determined to be "participating in session (response impossible)". When the presence of the PTT presentity is "participating in session (response impossible), the PTT presence with which the PTT watcher is provided is determined to be "participating in session (response impossible)". When the presence of the PTT presentity is "busy (response impossible)", the PTT presence with which the PTT watcher is provided is determined to be "busy (response impossible)".

When the aboard state presence is "aboard (parking)", the location presence is "parking site", and the presence of the PTT presentity is "online (response possible)", the PTT presence with which the PTT watcher is provided is determined to be "online (response possible)". When the presence of the PTT presentity is "participating in session (response possible)", the PTT presence with which the PTT watcher is provided is "participating in session (response possible)". When the presence of the PTT presentity is "participating in session (response impossible)", the PTT presence with which the PTT watcher is provided is "participating in session (response impossible)". When the presence of the PTT presentity is "busy (response impossible)", the PTT presence with which the PTT watcher is provided is determined to be "busy (response impossible)".

When the aboard state presence is "aboard (riding together)", the location presence is "*", and the presence of the PTT presentity is "online (response possible)", the PTT presence with which the PTT watcher is provided is determined to be "online (response possible)". When the presence of the PTT presentity is "participating in session (response possible)", the PTT presence with which the PTT watcher is provided is "participating in session (response possible)". When the presence of the PTT presentity is "participating in session (response impossible)", the PTT presence with which the PTT watcher is provided is "participating in session (response impossible)". When the presence of the PTT presentity is "busy (response impossible)", the PTT presence with which the PTT watcher is provided is determined to be "busy (response impossible)".

Operations of this example will now be described. When any PTT client Cp being the PTT presentity provides its own presence information to the client-provided presence information holding portion 37 of the PTT presence server 10P, the client-provided presence information holding portion 37 holds the presence information and also provides the presence information to the proxy watcher portion 31 of the presence processing server 30.

The proxy watcher portion 31 provides the presence information processing portion 32 of the presence processing server 30 with presence information of any PTT client Cp being the PTT presentity provided from the client-provided presence information holding portion 37.

The presence information processing portion 32 processes the presence information into presence information which the PTT presence server 10P should finally hold as presence information of any PTT client Cp being the PTT presentity, by reference to presence information of any PTT client Cp being the PTT presentity provided from the proxy watcher portion 31 and the "aboard state presence" and "location presence" of the user of any PTT client Cp being the PTT presentity provided from the generic presence server 50, and by reference to the presence processing policy 40a.

The presence information processing portion 32 provides processed presence information to the proxy presentity portion 33 of the presence processing server 30. The proxy presentity portion 33 provides the processed presence information to the processed presence information holding portion 38 of the PTT presence server 10P.

The processed presence information holding portion 38 uses processed presence information as presence information of any PTT client Cp being the PTT presentity to provide presence information to another PTT client Cp being the PTT watcher.

One example of a method of registering or updating the processing policy 40a of the generic presence server 50 will now be described with reference to FIG. 23.

The user terminal 9 comprises a client X of an application X and a presence information processing issuing portion 36. The presence information processing issuing portion 36 has a function of issuing processed presence information to other application presence servers. If the user terminal 9 is a cellular phone, for example, the presence information processing issuing portion 36 may be implemented using download application software such as i Appli®, Java® Appli or BREW® Appli.

If one of the other application presence servers described above is the generic presence server 50, the presence processing policy 40a that is a rule for converting between presence information of the generic presence server 50 and presence information of the application X can be easily registered and updated for the generic presence server 50 using the function of the presence information processing issuing portion 36 to issue processed presence information of the application X.

Example 10

The case where the presence processing server 30 processes presence information by reference to presence information provided by a plurality of presence servers, and a plurality of presence information referenced is prioritized will be described with reference to the drawings.

Figure 24:
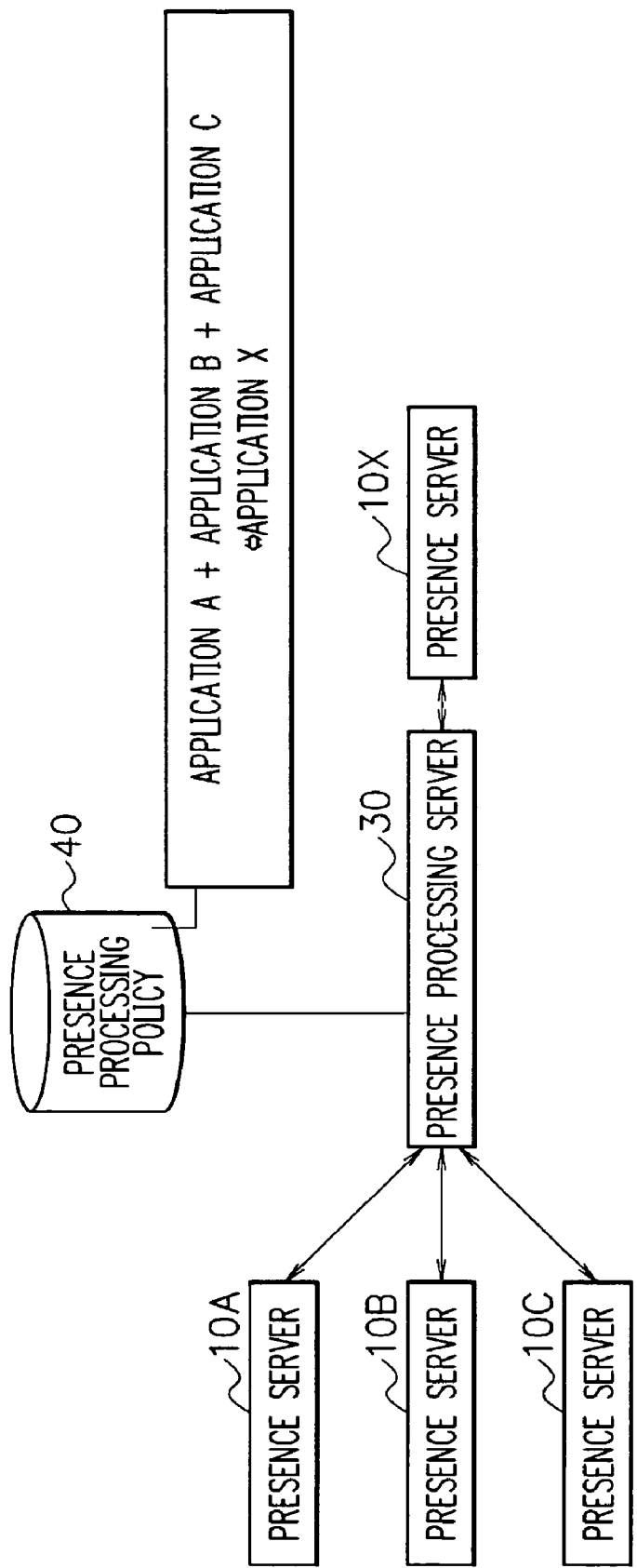
FIG. 24 shows the configuration of the presence service system in the tenth Example of the present invention.

As shown in FIG. 24, the presence processing server 30 receives the provision of presence information from the presence server 10A, the presence server 10B and a presence server 10C, respectively, and processes presence information to be provided to the presence server 10X by reference to the presence processing policy 40.

The presence processing policy 40 referenced by the presence processing server 30 is shown in Table 6. Presence information represented by "*" in Table 6 represents any presence information.

TABLE 6

Presence processing policy referenced when the application X watcher receives the provision of presence information from application A, application B and application C

| Application A presence | Application B presence | Application C presence | Application X presence |
| --- | --- | --- | --- |
| * | * (other than busy) | * | * |
| * | Busy | * | Busy |

An application A presence, an application B presence and an application C presence are combined and processed into an application X presence. When the application A presence is "*", the application B presence is "*(other than busy)", and the application C presence is "*", the application X presence is determined to be "*". This applies when a plurality of pieces of presence information referenced are not prioritized. When the application A presence is "*", the application B presence is "busy", and the application C presence is "*", the application X presence is determined to be "busy". This applies when a change of the presence of the application B is prioritized. That is, when the application B presence is "busy", the application X presence is determined to be "busy", independently of what are the application A presence and the application C presence.

Figure 25:
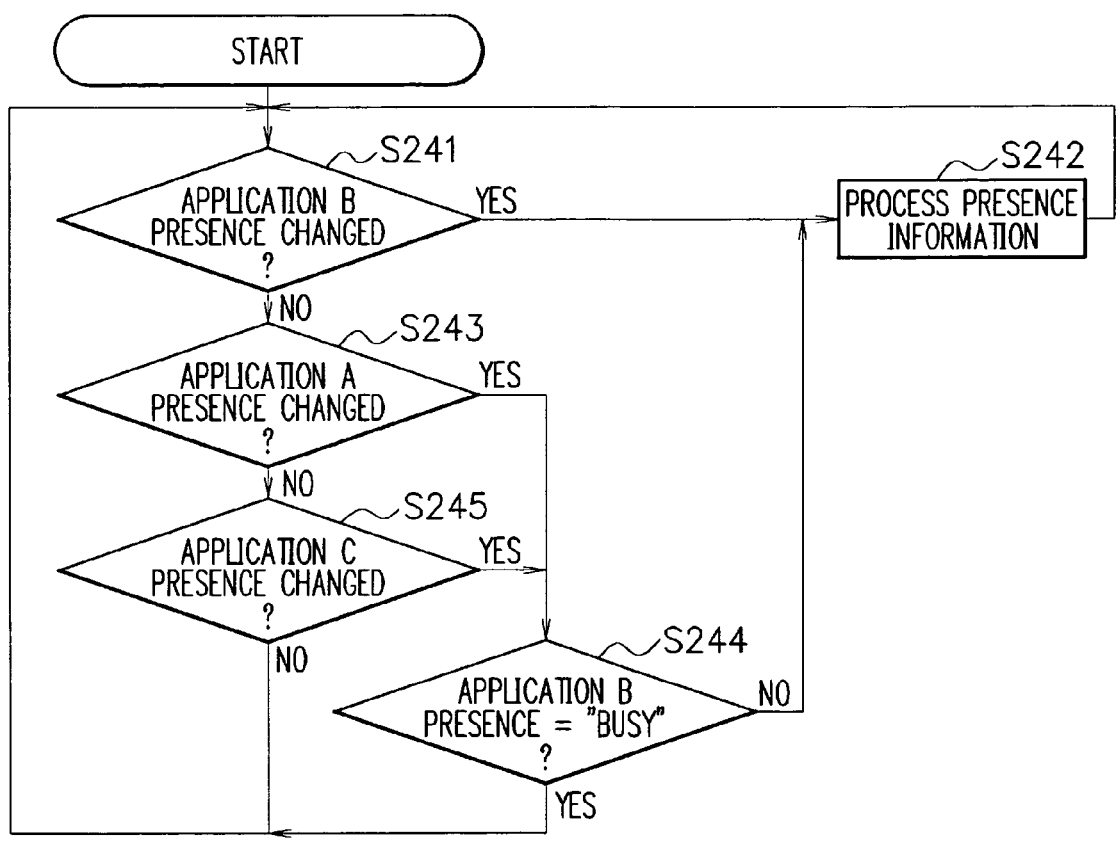
FIG. 25 is a flowchart showing a procedure of process operations of the presence processing server in the tenth Example of the present invention.

The flow of process operations in this example will be described with reference to FIG. 25. Each step of the flowchart will be abbreviated as "S" in the following description. First, the presence processing server 30 determines whether the application B presence is changed or not (S241). If the application B presence is changed, presence information is processed according to a change of the application B presence (S242).

If the application B presence is not changed, the presence processing server 30 determines whether the application A presence is changed or not (S243). If the application A presence is changed, whether the application B presence is "busy" or not is determined (S244). If the application B presence is "busy", processing returns to a process routine of step S241 without processing presence information. If the application B presence is not "busy", presence information is processed according to a change of the application A presence (S242).

If it is determined at step 243 that the application A presence is not changed, the presence processing server 30 determines whether the application C presence is changed or not (S245). If the application C presence is changed, whether the application B presence is "busy" or not is determined (S244). If the application B presence is "busy", processing returns to the process routine of step 241 without processing presence information. If the application B presence is not "busy", presence information is processed according to a change of the application C presence (S242).

If it is determined at step 245 that the application C presence is not changed, it means that none of the application presences is changed, and therefore processing returns to the process routine of step 241.

In this way, if a high priority is set to the application B presence "busy", the application X presence is determined to be "busy" independently of the application A presence and the application C presence when the application B presence is "busy", and in the case of other presence information, presence information is processed by reference to the application A presence, application B presence or application C presence.

Thus, the efficiency of processing of presence information carried out by reference to a plurality of presence information can be improved compared to a process in which presence information is processed each time when the application A presence, application B presence or application C presence is changed.

Figure 9:
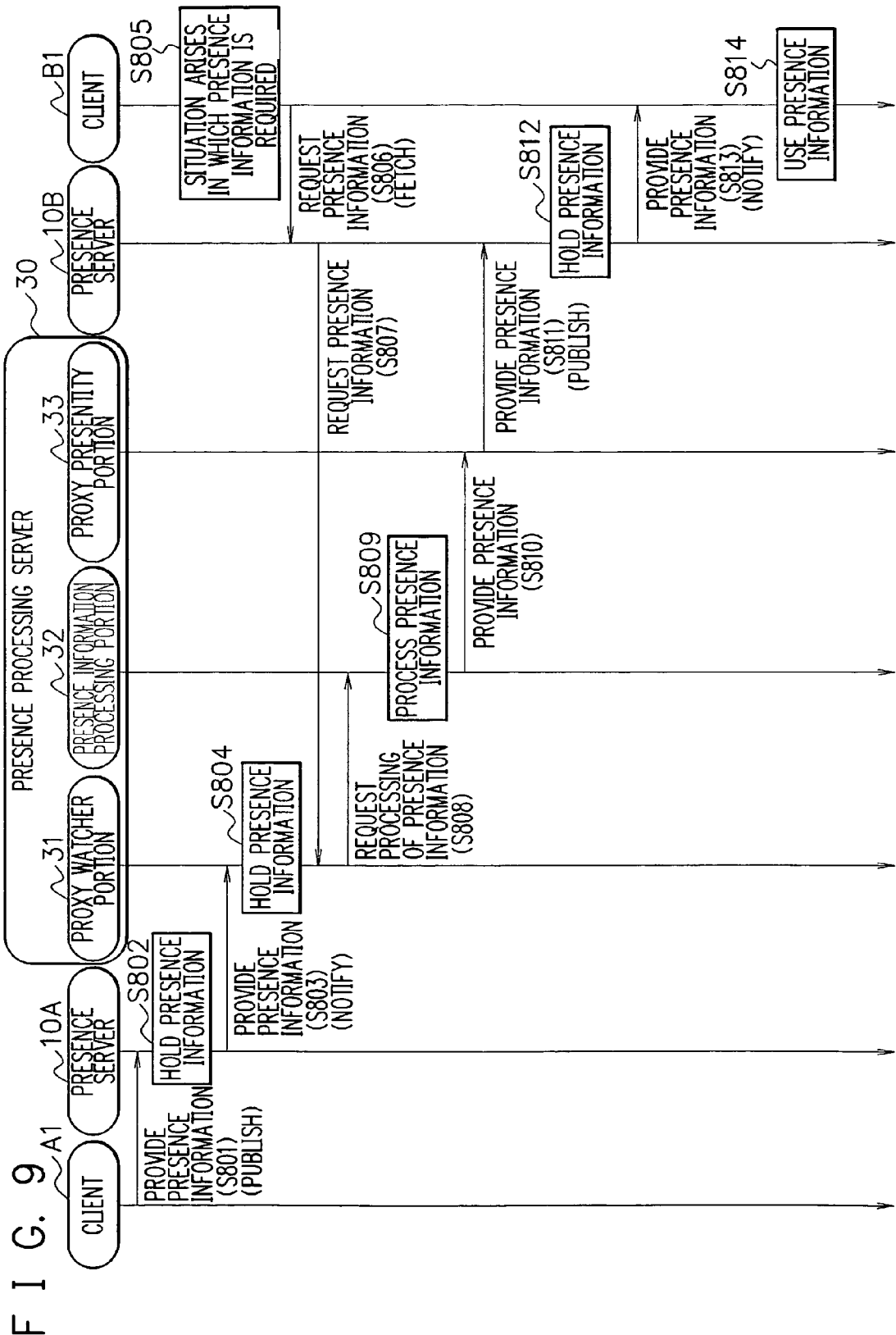
FIG. 9 is a sequence chart showing a procedure of process operations of processing presence information in the first Example of the present invention.

If presence information of high priority is changed, presence information may be processed with a presence information provider shown in FIG. 8 serving as a trigger, for example, and in other cases, presence information may be processed with a presence information requester shown in FIG. 9 serving as a trigger, for example. Whether the presence information provider is designated as a trigger or the presence information requester is designated as a trigger may be determined for a procedure of processing presence information in the case where other presence information is changed, according to the state of the presence information provider of high priority.

The embodiments and examples described above are suitable embodiments of the present invention, and various changes can be made within the spirit of the present invention. For example, the client may have the function of only one of the presentity and the watcher, and exchange of presence information in one direction may be realized with a simple configuration, and the configuration may be applied to various kinds of sensors, monitoring services or the like. In the presence processing policy, even same presence information for the same application may be processed differently for each user to differentiate a user from one another. The system configuration in which the presence server and the presence processing server are connected as separate apparatuses has been described, but the present invention is applicable to a configuration in which each function is implemented as one computer system and a configuration in which a plurality of server apparatuses and the like are added for each function as a matter of course.

What is claimed is:

1. A presence information providing system having connected thereto a plurality of presence services different in structure of presence information sent to and received from clients by presence servers, said presence information providing system comprising a presence processing server connected among said plurality of presence servers, processing said presence information received from one said presence service so that said received presence information matches other said presence services, and providing said processed presence information to other said presence services, wherein said presence processing server processes said presence information by reference to a processing policy in which a rule for allowing said presence information different in structure to be used among said plurality of presence services is set, wherein in said processing policy, a rule for processing presence information into said presence information which is provided to other presence services by reference to a plurality of said presence information given respective priorities, received from a plurality of said presence services, is set, wherein when said presence processing server processes said presence information received from said presence service, said presence processing server does not process said presence information even if said presence information from other said presence services of low priority is changed if said presence information from said presence service of high priority has a specific value, and wherein said presence processing server processes said presence information received from said presence service sequentially based on the respective priorities of said presence information.

2. The presence information providing system according to claim 1, wherein when said presence information of said client in one said presence service is changed, said presence processing server processes said presence information received from one said presence service so that said received presence information matches other said presence services, and provides said processed presence information to other said presence services.

3. The presence information providing system according to claim 1, wherein when said presence information of said client in one said presence service is required, said presence processing server processes said presence information received from one said presence service so that said received presence information matches other said presence services, and provides said processed presence information to other said presence services.

4. The presence information providing system according to claim 1, wherein when said presence information of said client in one said presence service is changed, said presence processing server processes said presence information received from one said presence service so that said received presence information matches other said presence services in response to a request from other said present services, and provides said processed presence information to other said presence services.

5. The presence information providing system according to claim 1, wherein when said presence information of said client in one said presence service is required, said presence processing server processes said presence information received from one said presence service so that said received presence information matches other said presence services in response to a request from other said present services, and provides said processed presence information to other said presence services.

6. The presence information providing system according to claim 1, wherein said presence server is provided for each application used by said presence service.

7. The presence information providing system according to claim 1, wherein a plurality of said presence servers are provided according to the frequency with which said presence information is changed.

8. The presence information providing system according to claim 1, wherein in said processing policy, a rule in which between presence services of applications for which multiple sessions are possible and other applications, when said client of said application for which multiple sessions are possible is participating in one or more sessions and said presence information of said client of said application for which multiple sessions are possible is said presence information for which a new session is possible between said applications for which multiple sessions are possible, said presence information of said client of said application for which multiple sessions are possible is determined to be said presence information for which a new session is impossible for said other applications is set.

9. The presence information providing system according to claim 1, wherein when said presence processing server processes said presence information received from said presence service, said presence processing server processes said presence information without referencing said presence information from other said presence services of low priority if said presence information from said presence service of high priority has a specific value.

10. The presence information providing system according to claim 1, wherein when said presence processing server processes said presence information received from said presence service, said presence processing server does not hold said processed presence information if said processed presence information is identical to said processed presence information which is already held.

11. The presence information providing system according to claim 1, comprising a presence processing server information providing service accepting an inquiry from said presence server and specifying, out of a plurality of said presence processing servers, said presence processing server processing said presence information received from one said presence service so that the presence information matches other said presence services.

12. The presence information providing system according to claim 1, comprising a user terminal information managing server routing the provision of said presence information between a first user terminal having one or more application clients and a second user terminal having one or more said application clients including application clients different from application clients possessed by said first user terminal.

13. The presence information providing system according to claim 1, comprising a generic presence server holding presence information as a base covering entire said presence service referenced when said presence information is processed by reference to said processing policy by said presence processing server.

14. The presence information providing system according to claim 13, wherein in said processing policy, a rule in which said presence information held by said generic presence server is added to said presence information of said client in one said presence service and the resultant presence information is provided to other said presence services is set.

15. The presence information providing system according to claim 1, comprising a generic presence server holding presence information as a base when said presence information received from one said presence service is processed into the presence information as a base covering entire said presence service by reference to said processing policy by said presence processing server, and said processed presence information as a base is further processed into said presence information which is provided to other said presence services by reference to said processing policy by said presence processing server.

16. A method of providing presence information among a plurality of presence services different in structure of presence information sent to and received from clients by presence servers, comprising:
 a step in which a presence processing server connected among said plurality of presence servers receives said presence information from one said presence service;
 a step in which said presence processing server processes said received presence information so that the presence information matches other said presence services;
and
 a step in which said presence processing server provides said processed presence information to other said presence services,
 wherein said presence processing server processes said presence information by reference to a processing policy in which a rule for processing said presence information different in structure so that the presence information can be used among said plurality of presence services is set,
 wherein in said processing policy, a rule for processing presence information into said presence information which is provided to other presence services by reference to a plurality of said presence information given respective priorities, received from a plurality of said presence services, is set,
 wherein in said processing step, said presence processing server processes said presence information received from said presence service, said presence processing server does not process said presence information even if said presence information from other said presence services of low priority is changed if said presence information from said presence service of high priority has a specific value, and
 wherein said presence processing server processes said presence information received from said presence service sequentially based on the respective priorities of said presence information.

17. The method according to claim 16, wherein in said receiving step, said presence processing server receives said presence information from one said presence service when said presence information of said client in one said presence service is changed.

18. The method according to claim 16, wherein in said processing step, said presence processing server processes said presence information received from one said presence service so that said received presence information matches other said presence services when said presence information of said client in one said presence service is required.

19. The method according to claim 16, wherein in said receiving step, said presence processing server receives said presence information from one said presence service when said presence information of said client in one said presence service is changed, and in said processing step, said presence processing server processes said presence information received from one said presence service so that said received presence information matches other said presence services in response to a request from other said presence services.

20. The method according to claim 16, wherein in said processing step, said presence processing server processes said presence information received from one said presence service so that said received presence information matches other said presence services in response to a request from other said presence services when said presence information of said client in one said presence service is required.

21. The method according to claim 16, wherein said presence server is provided for each application using said presence service.

22. The method according to claim 16, wherein a plurality of said presence servers are provided according to a frequency with which said presence information is changed.

23. The method according to claim 16, wherein in said processing policy, a rule in which between presence services of applications for which multiple sessions are possible and other applications, when said client of said application for which multiple sessions are possible is participating in one or more sessions and said presence information of said client of said application for which multiple sessions are possible is said presence information for which a new session is possible between said applications for which multiple sessions are possible, said presence information of said client of said application for which multiple sessions are possible is determined to be said presence information for which a new session is impossible for said other applications is set.

24. The method according to claim 16, wherein in said processing policy, a rule for processing presence information into said presence information which is provided to other presence services by reference to a plurality of said presence information given respective priorities, received from a plurality of said presence services, is set.

25. The method according to claim 16, wherein in said processing step, said presence processing server does not hold said processed presence information if said processed presence information is identical to said processed presence information which is already held.

26. The method according to claim 16, comprising:
 a step in which a presence processing server information providing service accepts an inquiry from said presence service; and
 a step in which the presence processing server information providing service specifies, out of a plurality of said presence processing servers, said presence processing server processing said presence information received from one said presence service so that said received presence information matches other said presence services.

27. The method according claim 16, comprising a step in which a user terminal information managing server routs the provision of said presence information between a first user terminal having one or more application clients and a second user terminal having one or more said application clients including application clients different from application clients possessed by said first user terminal.

28. The method according to claim 16, wherein in said processing process, said presence processing server references presence information as a base covering entire said presence service held by a generic presence server when said presence information is processed by reference to said processing policy.

29. The method according to claim 28, wherein in said processing policy, a rule in which said presence information held by said generic presence server is added to said presence information of said client in one said presence service, and the resultant presence information is provided to other said presence services is set.

30. The method according to claim 16, wherein in said processing process, said presence processing server processes said presence information received from one said presence service into presence information as a base covering entire said presence service held by said generic presence server by reference to said processing policy, and said presence processing server further processes said processed presence information as a base into said presence information which is provided to other said presence services by reference to said processing policy.

31. A server connected among presence servers of a plurality of presence services different in structure of presence information sent to and received from clients by presence servers, processing said presence information received from one said presence service so that said received presence information matches other said presence services, and providing said processed presence information to other said presence services,
   wherein said presence information is processed by reference to a processing policy in which a rule for processing said presence information different in structure so that the presence information can be used among said plurality of presence services is set,
   wherein in said processing policy, a rule for processing presence information into said presence information which is provided to other presence services by reference to a plurality of said presence information given respective priorities, received from a plurality of said presence services, is set,
   wherein when said server processes said presence information received from said presence service, said server does not process said presence information even if said presence information from other said presence services of low priority is changed if said presence information from said presence service of high priority has a specific value, and
   wherein said server processes said presence information received from said presence service sequentially based on the respective priorities of said presence information.

32. The server according to claim 31, wherein said presence information received from one said presence service is processed so that said received presence information matches other said presence services when said presence information of said client in one said presence service is changed.

33. The server according to claim 31, wherein said presence information received from one said presence service is processed so that said received presence information matches other said presence services, and said processed presence information is provided to other said presence services when said presence information of said client in one said presence service is required.

34. The server according to claim 31, wherein said presence information received from one said presence service is processed so that said received presence information matches other said presence services in response to a request from other said presence services when said presence information of said client in one said presence service is changed.

35. The server according to claim 31, wherein said presence information received from one said presence service is processed so that said received presence information matches other said presence services in response to a request from other said presence services, and said processed presence information is provided to other said presence services when said presence information of said client in one said presence service is required.

36. The server according to claim 31, wherein in said processing policy, a rule in which between presence services of applications for which multiple sessions are possible and other applications, when said client of said application for which multiple sessions are possible is participating in one or more sessions and said presence information of said client of said application for which multiple sessions are possible is said presence information for which a new session is possible between said applications for which multiple sessions are possible, said presence information of said client of said application for which multiple sessions are possible is determined to be said presence information for which a new session is impossible for said other applications is set.

37. The server according to claim 31, wherein when said presence information received from said presence service is said processed presence information is processed without referencing said presence information from other said presence services of low priority if said presence information from said presence service of high priority has a specific value.

38. The server according to claim 31, wherein said server is specified out of a plurality of said presence processing servers by a presence processing server information providing service accepting an inquiry from said presence service, and processes said presence information received from one said presence service so that said received presence information matches other said presence services.

39. The server according to claim 31, wherein presence information as a base covering entire said presence service held by a generic presence server is referenced when said presence information is processed by reference to said processing policy.

40. The server according claim 39, wherein in said processing policy, a rule in which said presence information held by said generic presence server is added to said presence information of said client in one said presence service, and the resultant presence information is provided to other said presence services is set.

41. The server according to claim 31, wherein said presence information received from one said presence service is processed into presence information as a base covering entire said presence service held by the generic presence server by reference to said processing policy, and said processed presence information as a base is further processed into said presence information which is provided to other said presence services by reference to said processing policy.

42. The server according to claim 31, wherein when said presence information received from said presence service is processed, said processed presence information is not held if said processed presence information is identical to said processed presence information which is already held.

\* \* \* \* \*